US012603939B2

(12) United States Patent
Ishimura

(10) Patent No.: US 12,603,939 B2
(45) Date of Patent: Apr. 14, 2026

(54) INFORMATION PROCESSING APPARATUS, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Takanari Ishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 813 days.

(21) Appl. No.: 17/409,164

(22) Filed: Aug. 23, 2021

(65) Prior Publication Data

US 2022/0308809 A1 Sep. 29, 2022

(30) Foreign Application Priority Data

Mar. 29, 2021 (JP) ................................. 2021-054520

(51) Int. Cl.
*G06F 3/12* (2006.01)
*H04L 67/141* (2022.01)
*H04N 1/44* (2006.01)

(52) U.S. Cl.
CPC ......... *H04L 67/141* (2013.01); *H04N 1/4413* (2013.01); *G06F 3/1292* (2013.01)

(58) Field of Classification Search
CPC .... H04L 67/141; H04N 1/4413; G06F 3/1292
USPC ....................................................... 709/227
See application file for complete search history.

(56) References Cited

U.S. PATENT DOCUMENTS

| | | | | |
|---|---|---|---|---|
| 10,116,449 B2 * | 10/2018 | Gomi | ...................... | H04L 63/06 |
| 10,587,596 B1 * | 3/2020 | Sahar | ...................... | H04L 63/08 |
| 10,742,831 B1 * | 8/2020 | Haapanen | .......... | H04N 1/00856 |
| 10,750,049 B2 * | 8/2020 | Yamada | ................ | H04W 76/18 |
| 11,023,568 B2 | 6/2021 | Sato | | |

(Continued)

FOREIGN PATENT DOCUMENTS

| | | |
|---|---|---|
| JP | 2018-198400 A | 12/2018 |
| JP | 2019-009717 A | 1/2019 |

(Continued)

OTHER PUBLICATIONS

Oct. 29, 2024 Office Action issued in Japanese Patent Application No. 2021-054520.

(Continued)

*Primary Examiner* — Moustafa M Meky
*Assistant Examiner* — Kidest Mendaye
(74) *Attorney, Agent, or Firm* — Oliff PLC

(57) ABSTRACT

An information processing apparatus includes a memory storing identification information on the information processing apparatus and a processor configured to: generate a code image including the identification information and cause a display to display the code image; detect a communication content from a terminal apparatus and, if the communication content includes the identification information on the information processing apparatus, make a connect request to the terminal apparatus as a transmission source of the communication content via a communication unit that performs wireless communication; and perform control to establish a connection to the terminal apparatus.

16 Claims, 18 Drawing Sheets

(56)                References Cited

U.S. PATENT DOCUMENTS

| | | | |
|---|---|---|---|
| 11,025,619 B2 * | 6/2021 | Sun | H04L 9/3247 |
| 11,093,602 B2 * | 8/2021 | Sato | H04L 9/30 |
| 2013/0007442 A1 * | 1/2013 | Mao | H04L 9/3247 |
| | | | 713/156 |
| 2018/0285039 A1 * | 10/2018 | Kawai | H04N 1/00888 |
| 2019/0012117 A1 * | 1/2019 | Zhao | H04N 1/32122 |
| 2019/0075460 A1 * | 3/2019 | Sakamoto | H04L 63/104 |
| 2019/0141214 A1 * | 5/2019 | Matsumoto | H04N 1/442 |
| 2019/0196761 A1 * | 6/2019 | Minakawa | G06F 3/1238 |
| 2019/0246257 A1 * | 8/2019 | Hasegawa | H04W 4/80 |
| 2019/0306919 A1 * | 10/2019 | Miyake | G06F 3/1292 |
| 2021/0099950 A1 * | 4/2021 | Shibata | H04L 9/3247 |
| 2021/0194703 A1 * | 6/2021 | Queralt | H04L 63/0815 |
| 2021/0234858 A1 * | 7/2021 | Nakagawa | H04L 63/0838 |
| 2021/0307088 A1 * | 9/2021 | Yamaguchi | G06F 3/1236 |

FOREIGN PATENT DOCUMENTS

| | | | |
|---|---|---|---|
| JP | 2019-103050 A | 6/2019 | |
| JP | 2020-184724 A | 11/2020 | |
| JP | 2021-39468 A | 3/2021 | |

OTHER PUBLICATIONS

Sep. 9, 2025 Office Action issued in Japanese Patent Application
No. 2024-226346.

* cited by examiner

| | |
|---|---|
| 802 — LOCAL NAME | |
| 804 — ONE-TIME PASSWORD | |
| 806 — CLOUD SERVICE COUNT | |
| 808 — CLOUD ID | |

FIG. 12

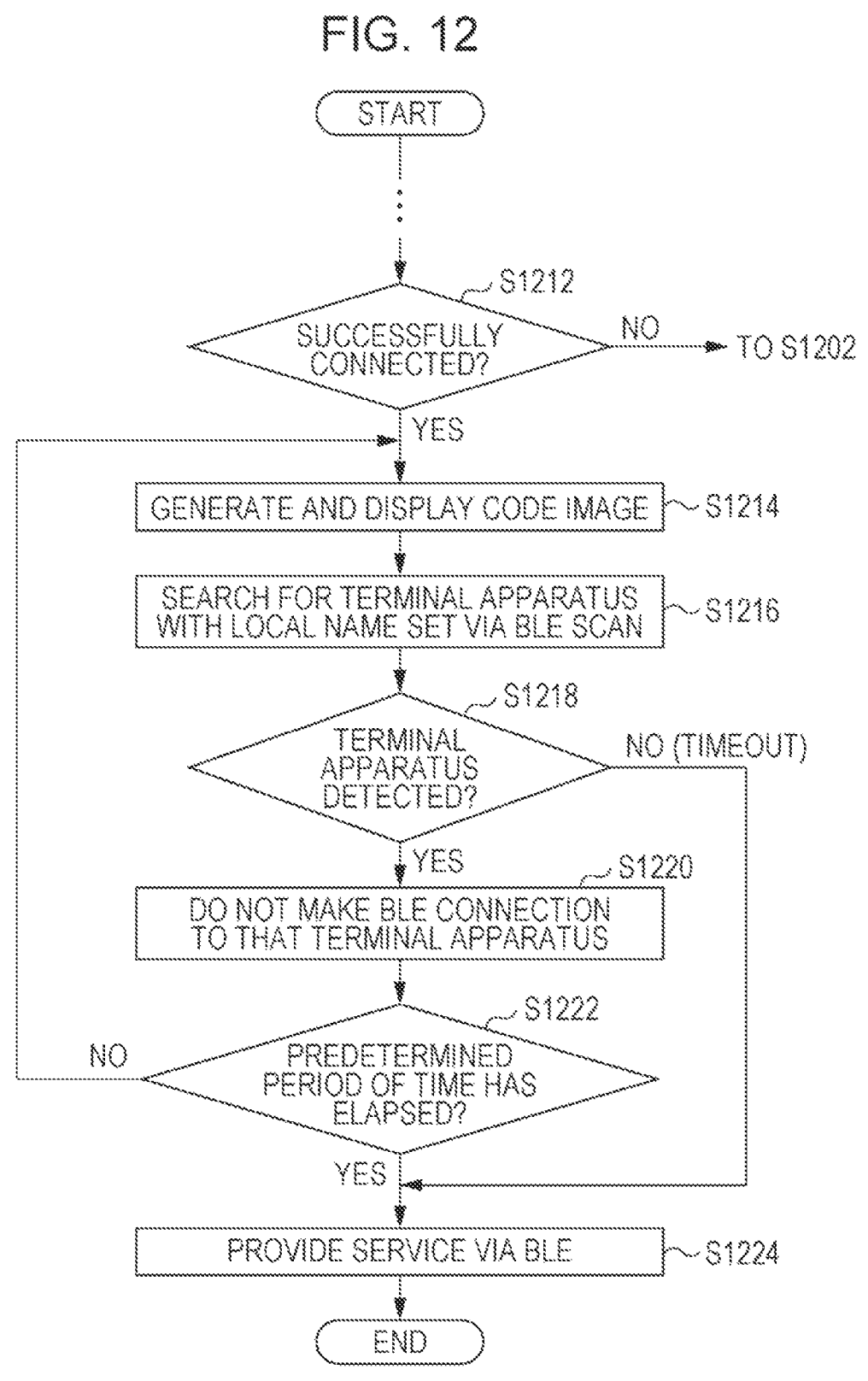

START

S1212

SUCCESSFULLY CONNECTED? — NO → TO S1202

YES

GENERATE AND DISPLAY CODE IMAGE ～S1214

SEARCH FOR TERMINAL APPARATUS WITH LOCAL NAME SET VIA BLE SCAN ～S1216

S1218

TERMINAL APPARATUS DETECTED? — NO (TIMEOUT)

YES

S1220

DO NOT MAKE BLE CONNECTION TO THAT TERMINAL APPARATUS

S1222

PREDETERMINED PERIOD OF TIME HAS ELAPSED? — NO

YES

PROVIDE SERVICE VIA BLE ～S1224

END

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-054520 filed Mar. 29, 2021.

BACKGROUND

(i) Technical Field

The present disclosure relates to an information processing apparatus, an information processing system, and a non-transitory computer readable medium.

(ii) Related Art

Japanese Unexamined Patent Application Publication No. 2018-198400 discloses an image processing apparatus. The image processing apparatus addresses a problem that a user identity (ID) or password may be stolen by a third party when the user ID or password is input on an operation unit of a device at a public place to utilize a network. The image processing apparatus may communicate with a mobile terminal of a user having an authentication module for biometric authentication. When verification data is received from a service providing system, the authentication module of the mobile terminal for biometric authentication identifies the verification data. The image processing apparatus thus causes the authentication module of the mobile terminal to perform an authentication process.

An information processing apparatus, terminal apparatus A, and terminal apparatus B may be present in an area. A user having the terminal apparatus A is present near the information processing apparatus and may now wish to wirelessly communicate with the information processing apparatus to utilize the information processing apparatus. However, wireless communication may now happen to be established between the information processing apparatus and the terminal apparatus B that is farther from the information processing apparatus than the terminal apparatus A.

SUMMARY

Aspects of non-limiting embodiments of the present disclosure relate to providing an information processing apparatus, information processing system, and non-transitory computer readable medium reducing the possibility that a terminal apparatus, other than a terminal apparatus held by a user who is near the information processing apparatus and tries to use the information processing apparatus, communicates with the information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory storing identification information on the information processing apparatus and a processor configured to: generate a code image including the identification information and cause a display to display the code image; detect a communication content from a terminal apparatus and, if the communication content includes the identification information on the information processing apparatus, make a connect request to the terminal apparatus as a transmission source of the communication content via a communication unit that performs wireless communication; and perform control to establish a connection to the terminal apparatus.

BRIEF DESCRIPTION OF THE DRAWINGS

Exemplary embodiment of the present disclosure will be described in detail based on the following figures, wherein:

FIG. 6 is a flowchart illustrating an example of a process of the exemplary embodiment;

FIG. 8 illustrates a data structure of connection information;

FIG. 12 is a flowchart illustrating an example of a process of the exemplary embodiment;

DETAILED DESCRIPTION

Exemplary embodiment of the disclosure is described below with reference to the drawings.

Figure 1A:
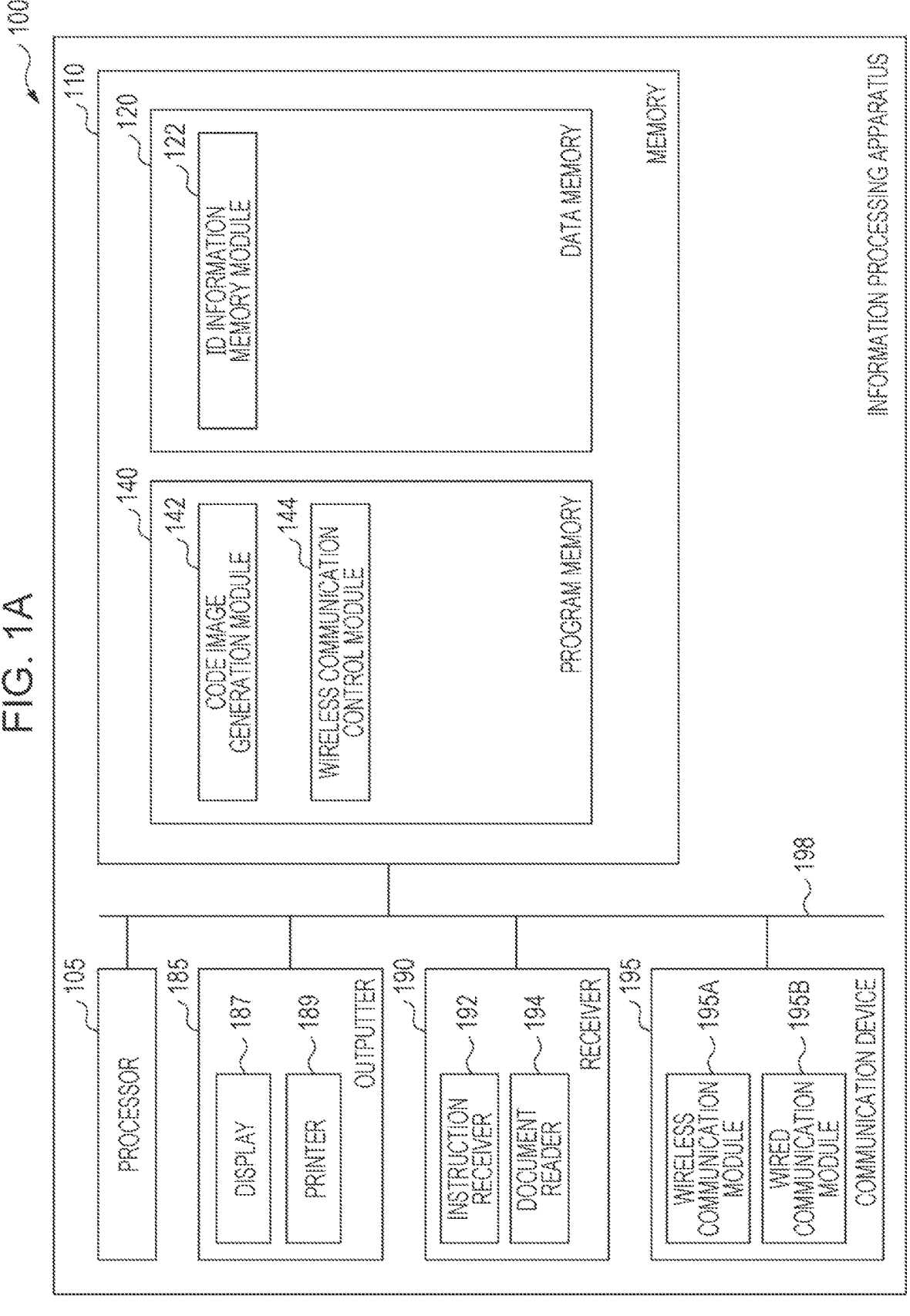
FIG. 1A is a conceptual module configuration diagram of a configuration of an exemplary embodiment.
Figure 1B:
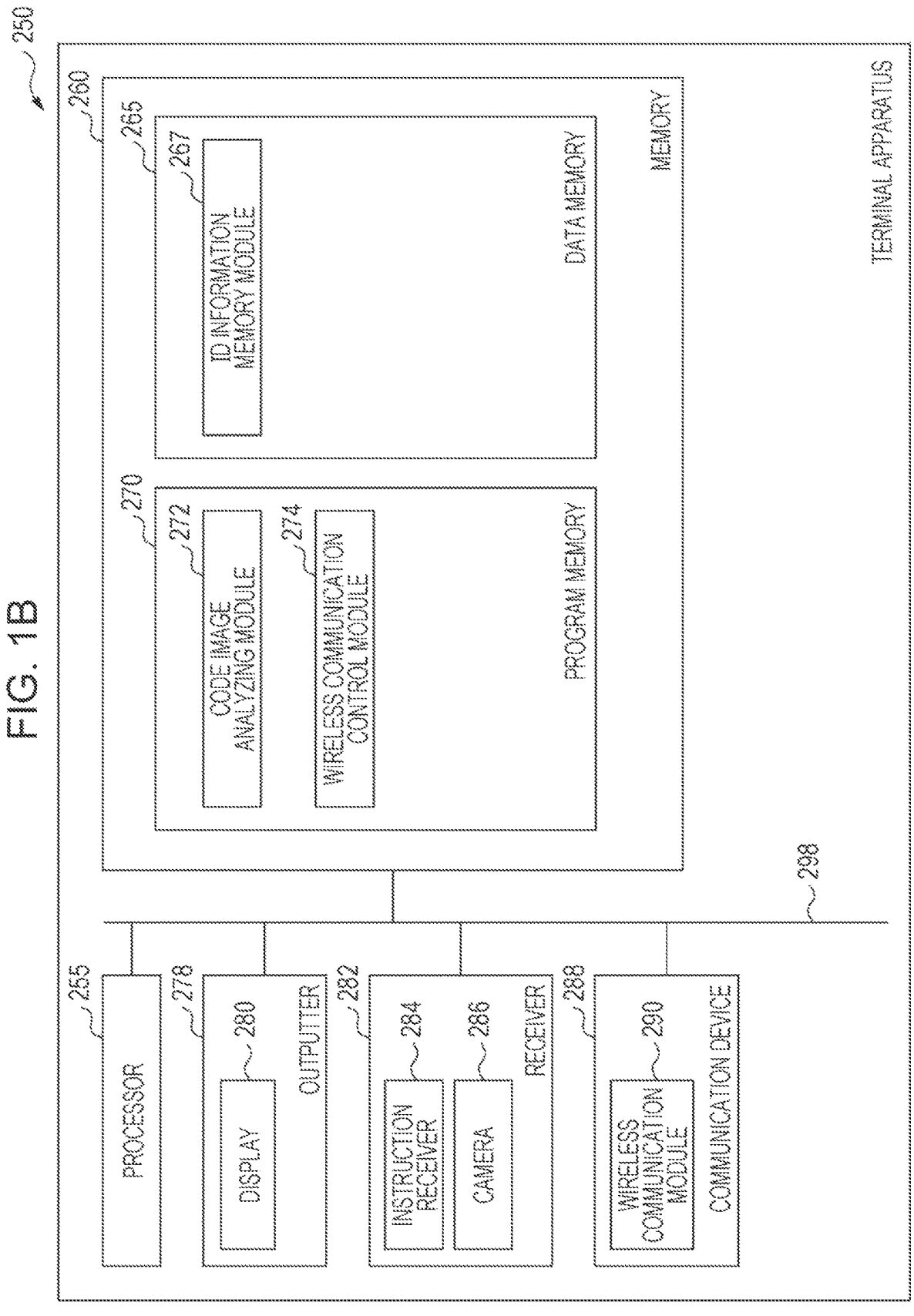
FIG. 1B is a conceptual module configuration diagram of a configuration of the exemplary embodiment.

FIGS. 1A and 1B illustrate a conceptual module configuration of a structure of the exemplary embodiment.

The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of a system, method, and computer program that causes the modules to function (including a program that causes a computer to execute each step, a program that causes the computer to function as an element, and a program that causes the computer to implement each function). In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module.

In the discussion that follows, the term "connection" refers to not only a physical connection but also a logic connection (such as an exchange of data, instructions, data reference relationship, or login).

The term "predetermined" signifies that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other.

A statement that "if A, B is to be performed" is intended to signify that a determination as to whether something is A is performed and that if something is determined as A, an action B is to be taken. The statement becomes meaningless if the determination as to whether something is A is not performed. If a discussion is made of events "A, B, and C," the discussion is applicable to at least one of the events "A, B, and C" unless otherwise noted. For example, the discussion is applicable to the case in which only the event A is selected.

The term "system" or the term "apparatus" refers to an arrangement where multiple computers, a hardware configuration, and an apparatus are interconnected via a communication network (including a one-to-one communication connection). The term system or the term apparatus also refers to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the exemplary embodiment in FIG. 1A has a function of performing a wireless communication process with a terminal apparatus 250 held by a user 210. Referring to FIG. 1A, the information processing apparatus 100 includes, at least, a processor 105, memory 110, communication device 195 and bus 198 that connects these elements to exchange data. The information processing apparatus 100 may further include an outputter 185 and receiver 190. The processor 105, memory 110, outputter 185, receiver 190, and communication device 195 exchange data via the bus 198.

The block diagram in FIG. 1A also indicates a hardware configuration of a computer that implements the information processing apparatus 100 of the exemplary embodiment. The hardware configuration of the computer that executes a program of the exemplary embodiment is the computer illustrated in FIG. 1A. Specifically, the hardware configuration is a personal computer or a computer that may be used as a server. Specifically, the processor 105 and memory 110 are used as a processing unit and a storage device, respectively.

One or more processors 105 may be used. The processor 105 may include a central processing unit (CPU) or a microprocessor. If multiple processors 105 are used, they are tightly coupled or loosely coupled. For example, a single processor 105 may include multiple processor cores. Multiple computers are coupled as a system that virtually functions as a single computer. Specifically, a loosely coupled multi-processor may be configured as a cluster system or a computer cluster. The processor 105 executes a program on a program memory 140.

The memory 110 may include a semiconductor memory, such as a register or a cache memory, in the processor 105 or a memory, such as a random-access memory (RAM) or a read-only memory (ROM). The memory 110 may also be an internal memory device, such as a hard disk drive (HDD) or a solid-state drive (SSD), each functioning as a persistent memory, or an external memory device or an auxiliary memory device, such as a compact disc (CD), or digital versatile disc (DVD), Blu-ray (registered trademark) disc, universal serial bus (USB) memory, or memory card. The memory 110 may also be a memory device of a server connected to the information processing apparatus 100 via a communication network.

The memory 110 includes a data memory 120 storing data and a program memory 140 storing programs. The data memory 120 and program memory 140 may store programs of the modules illustrated in FIG. 1A, programs such as an operating system to start up the computer, and data, such as parameters that appropriately vary in the execution of the modules.

The outputter 185 includes a display 187 and printer 189. The display 187 may be a liquid-crystal display, organic electroluminescent (EL) display, three-dimensional display, or projector and displays, in text or image, process results from the processor 105 and data on the data memory 120. The printer 189 may serve as only a printer or may be a multi-function device and prints the process results from the processor 105 and data on the data memory 120. The outputter 185 may also include a speaker and actuator to vibrate a device.

The receiver 190 includes an instruction receiver 192 and document reader 194. The instruction receiver 192 includes a keyboard, mouse, microphone, and/or camera (including eye-gaze detection camera) and receives data generated in response to user operation performed on these device (such as an action, voice, or gaze of a user).

A touch screen serving the functions of both the display 187 and the instruction receiver 192 may be used. In such a case, without the physical presence of keys, the keyboard function may be implemented by drawing a keyboard (called a software keyboard or a screen keyboard) on the touch screen using software.

The display 187 and instruction receiver 192 are used as user interfaces.

The document reader 194, such as a scanner or camera, reads or photographs a document to create image data.

The communication device 195 is a communication network interface used to connect to another apparatus via a communication network.

A wireless communication module 195A (an example of a communication unit) performs a wireless communication with the terminal apparatus 250. The wireless communication may be Bluetooth, Bluetooth Low Energy (BLE), or Wi-Fi. For example, the wireless communication module 195A utilizes BLE in the following discussion.

The wired communication module 195B performs a wired communication with another apparatus (e.g., a service providing apparatus 230 described with reference to FIG. 2, or a FIDO server 565, cloud server (contract) 570, or cloud server (public) 575 described with reference to FIG. 5). For example, the wired communication module 195B may utilize the Internet.

A computer program of the exemplary embodiment is implemented when the computer program as software is read onto the program memory 140 as a hardware resource and the software and hardware cooperate with each other.

Specifically, to implement the exemplary embodiment, information processing based on software is performed by hardware resources (at least including the processor 105 and the memory 110 and in some cases including further the outputter 185, receiver 190, and communication device 195). The exemplary embodiment is thus implemented in accordance with the laws of nature.

The hardware configuration in FIGS. 1A and 1B is illustrated for exemplary purposes only. The exemplary embodiment is not limited to the configuration illustrated in FIGS. 1A and 1B and is acceptable as long as the configuration implements the modules of the exemplary embodiment. For example, the processor 105 may include a graphics processing unit (GPU) (including general-purpose computing on graphics processing unit (GPGPU)) as the processor 255. Part of the modules may be implemented by a dedicated hardware resource (such as application specific integrated circuit (ASIC)) or field-programmable gate array (FPGA) that is a reconfigurable integrated circuit. Part of the modules may be in an external system that is connected via a communication network. Multiple of the system in FIGS. 1A and 1B may be operatively coupled via a communication network. The information processing apparatus 100 in FIG. 1A may be incorporated in a server, personal computer, information appliance, robot, copier, fax, scanner, printer, or multi-function apparatus (an image processing apparatus having at least two of scanner function, printer function, copier function, and fax function). The terminal apparatus 250 in FIG. 1B may be incorporated into a mobile information communication apparatus (such as mobile phone, smart phone, mobile device, or wearable computer).

The processor 105 is connected to the memory 110, outputter 185, receiver 190, and communication device 195 via the bus 198. The processor 105 executes a process in accordance with the computer program that describes an execution sequence of each module and stored on the program memory 140. For example, in response to an event when the wireless communication module 195A receives a communication from the terminal apparatus 250 or the instruction receiver 192 receives user operation, the processor 105 performs the process of a module responsive to the event on the program memory 140, causes the data memory 120 to store the process results, outputs the process results to the display 187, or transmits the process results to another apparatus by controlling the communication device 195.

The memory 110 includes the data memory 120 and program memory 140 and is connected to the processor 105, outputter 185, receiver 190, and communication device 195 via the bus 198.

The data memory 120 includes an identification (ID) information memory module 122.

The ID information memory module 122 stores identification information on the information processing apparatus 100. In the exemplary embodiment (including a system configuration of a single information processing apparatus 100 or a system configuration including the information processing apparatus 100 and the terminal apparatus 250), the identification information is used to uniquely identify the information processing apparatus 100. For example, the identification information may be a media access control address (MAC), hash value, serial number, or name assigned to the information processing apparatus 100.

Identification number on the ID information memory module 122 may be unique information or modified as described below.

The program memory 140 includes a code image generation module 142 and wireless communication control module 144.

The code image generation module 142 generates a code image including the identification information on the ID information memory module 122 and causes the display 187 to display the identification information. The code image refers to an image code that is systematically generated to represent digital data in a machine-readable manner. Specifically, the code image may be one-dimensional bar code, two-dimensional code, or the like. Recently, Quick Response Code (QR code (registered trademark)) has been used as the two-dimensional code. The QR code is utilized in the exemplary embodiment.

The code image displayed on the display 187 is read by the terminal apparatus 250.

The terminal apparatus 250 enabled to read the code image (or the user 210 having the terminal apparatus 250) may read the code image displayed on the display 187 of the information processing apparatus 100 and is thus near the information processing apparatus 100. The nearness signifies that the terminal apparatus 250 or the user 210 is near enough in distance to read, with at least a camera function of the terminal apparatus 250, the code image displayed on the display 187.

Specifically, the code image generation module 142 may generate the code image including connection information 800 described below with reference to FIG. 8.

A message reading "Please read the code image using your terminal apparatus 250" may be also displayed together with the code image on the display 187.

When the wireless communication control module 144 detects a communication from the terminal apparatus 250, the identification information on the information processing apparatus 100 may be included in the communication. In such a case, the wireless communication control module 144 makes a connect request to the terminal apparatus 250 serving as a communication source of the communication via the wireless communication module 195A that supports wireless communication. Specifically, this operation is performed if the communication is detected from the terminal apparatus 250 having read the code image displayed on the display 187 of the information processing apparatus 100.

The "communication" detected from the terminal apparatus 250 may be a beacon from the terminal apparatus 250.

The wireless communication control module 144 performs control to establish a connection to the terminal apparatus 250.

When the wireless communication control module 144 detects a communication from the terminal apparatus 250 and if the identification information on the information processing apparatus 100 is not included in the communication, the wireless communication control module 144 performs control not to make a connect request to the terminal apparatus 250. Specifically, this operation is performed if the communication is detected from the terminal apparatus 250 not having read the code image displayed on the display 187 of the information processing apparatus 100. Wireless communication connection is not established with the terminal apparatus 250.

If a communication from a second terminal apparatus 250 is detected within a predetermined period of time from the establishment of the connection, the wireless communication control module 144 may perform control not to connect with the second terminal apparatus 250. Specifically, the information processing apparatus 100 performs wireless communication with only the terminal apparatus 250 that has established first the wireless communication via the wireless communication module 195A.

The second terminal apparatus 250 refers to a terminal apparatus 250 other than the terminal apparatus 250 that has established the wireless communication.

However, if the communication with the terminal apparatus 250 having established the connection becomes unsuccessful, the wireless communication control module 144 may perform control to permit the connection to the second terminal apparatus 250 via the wireless communication module 195A.

The information processing apparatus 100 may be an image processing apparatus.

In such a case, if the terminal apparatus 250 utilizes a read function of the information processing apparatus 100 (e.g., a scan function in which the terminal apparatus 250 acquires the image read by the document reader 194), the wireless communication control module 144 may perform control not to make a connection to the second terminal apparatus 250. The read function is used not by multiple persons but by a single person who utilizes the information processing apparatus 100. Specifically, the read function for the terminal apparatus 250 to acquire a document image read by the document reader 194 in the information processing apparatus 100 may now be used. An instruction to perform the read function with a document placed on the document reader 194 in the information processing apparatus 100 is a person who operates the information processing apparatus 100 in front of the information processing apparatus 100. In the wireless communication, a terminal apparatus 250 at a slightly distant location may be connected. In such a case, if a wrong terminal apparatus 250 is selected, the image of the read document may not be transmitted to the terminal apparatus 250 of the person who has operated the information processing apparatus 100 but may be erroneously transmitted to the wrong terminal apparatus 250 of another person. Concurrent connection to multiple terminal apparatuses 250 may not be desirable.

If information indicating which of the functions of the information processing apparatus 100 is to be used is included in information transmitted in the communication from the terminal apparatus 250, the terminal apparatus 250 and the second terminal apparatus 250 may be enabled to perform a determination as to whether to use the read function of the information processing apparatus 100.

If a communication from a second terminal apparatus 250 is detected within a predetermined period of time from the establishment of the connection, the wireless communication control module 144 may connect to the second terminal apparatus 250 via the wireless communication module 195A. Specifically, the terminal apparatus 250 may establish first the wireless communication connection via the wireless communication module 195A, a communication may be detected from a second or subsequent terminal apparatus 250, and the identification information on the information processing apparatus 100 (e.g., the identification information embedded in the code image displayed on the display 187) may be included in the communication. In such a case, the information processing apparatus 100 connects to the second or subsequent terminal apparatus 250 via the wireless communication module 195A and establishes the wireless communication connection.

The information processing apparatus 100 may be an image processing apparatus.

In such a case, if a terminal apparatus 250 and a second terminal apparatus 250 utilize a print function of the information processing apparatus 100 (print function using the printer 189), the wireless communication control module 144 may enable the second terminal apparatus 250 to connect to the information processing apparatus 100 via the wireless communication module 195A. The print function may simply successively perform received print instructions. The print function may be utilized with multiple users connected and the information processing apparatus 100 is thus utilized by the multiple users. Specifically, when the terminal apparatus 250 utilizes the print function of the information processing apparatus 100, the terminal apparatus 250 simply transmits a print job. Even when print jobs are substantially concurrently received from multiple terminal apparatuses 250, the received print jobs are simply printed in the order of reception. Concurrent multiple connections may thus work.

If information indicating which of the functions of the information processing apparatus 100 is to be used is included in the communication from the terminal apparatus 250, the terminal apparatus 250 and the second terminal apparatus 250 may be enabled to determine whether to utilize the print function of the information processing apparatus 100.

A communication may be detected from the second terminal apparatus 250 within a specific period of time from the establishment of the connection and the second terminal apparatus 250 may be nearer to the information processing apparatus 100 than the terminal apparatus 250. The wireless communication control module 144 may perform control to enable the second terminal apparatus 250 to connect to the information processing apparatus 100 via the wireless communication module 195A. A determination as to whether the terminal apparatus 250 is nearer to the information processing apparatus 100 may be performed based on the strength of a radiowave received from the terminal apparatus 250. Specifically, if the strength of the radiowave received from the terminal apparatus 250 having established the connection (the terminal apparatus 250A) is higher than the strength of the radiowave received from the second terminal apparatus 250 (the terminal apparatus 250B), the terminal apparatus 250A is nearer to the information processing apparatus 100 than the terminal apparatus 250B. Conversely, if the strength of the radiowave received from the terminal apparatus 250B is higher than the strength of the radiowave received from the terminal apparatus 250A, the terminal apparatus 250B is nearer to the information processing apparatus 100 than the terminal apparatus 250A.

A communication from the terminal apparatus 250 may be detected and information indicating a Fast Identity Online (FIDO) service may be included in the communication. In such a case, the wireless communication control module 144 may perform control to make a connection to the communication interface module 350 serving as a communication source via the wireless communication module 195A. Specifically, if the communication from the terminal apparatus 250 includes the identification information on the information processing apparatus 100 and the information indicating the FIDO service, the wireless communication control module 144 performs control to make a connection via the wireless communication module 195A to the terminal apparatus 250 serving as the communication source.

If a communication detected from the terminal apparatus 250 does not include the information indicating the FIDO service, the wireless communication control module 144 may perform control not to make a connection to the terminal apparatus 250 serving as the communication source.

Specifically, if the communication from the terminal apparatus 250 includes the identification information on the information processing apparatus 100 but is without the information indicating the FIDO service, the wireless communication control module 144 performs control not to make the connection to the terminal apparatus 250 serving as the communication source.

After the display 187 in the information processing apparatus 100 displays the identification information, the code image generation module 142 may modify that identification information. For example, the wireless communication via the wireless communication module 195A is restricted when the terminal apparatus 250 leaves away from the information processing apparatus 100 after performing the wireless communication via the wireless communication module 195A in the information processing apparatus 100. The phrase "after the display 187 in the information processing apparatus 100 displays the identification information" may signify an even later timing, specifically "after the wireless communication module 195A establishes the wireless communication connection."

The timings when the identification information on the information processing apparatus 100 is modified may include a timing when the information processing apparatus 100 is started up, a timing when the information processing apparatus 100 shifts into a power-saving mode, a timing when the information processing apparatus 100 is restored from the power-saving mode, a timing at every predetermined period of time, a timing when connection is established with the terminal apparatus 100, a timing when the connection to the terminal apparatus 100 is disconnected, a timing when an update operation is performed by an operator, a timing when an operation to display the code image is performed by an operator, or a combination of two or more of the timings.

The code image generation module 142 may generate not only the identification information on the information processing apparatus 100 but also the code image including a password. The password is used to decrypt the identification information included in the communication from the terminal apparatus 250.

Using the password, the wireless communication control module 144 may decrypt the identification information included in the communication from the terminal apparatus 250.

The code image generation module 142 generates not only the identification information on the information processing apparatus 100 but also the code image including information indicating a service provided via the information processing apparatus 100.

Using the information indicating the service and included in the communication from the terminal apparatus 250, the wireless communication control module 144 may connect to an external service.

After establishing the connection, the wireless communication control module 144 may acquire authentication information included in the communication from the terminal apparatus 250 and permit the user of the information processing apparatus 100 to utilize the service in accordance with the acquired authentication information. For example, a process concerning the authentication information is a process subsequent to a Bluetooth Low Energy (BLE) connection and corresponds to an authentication process that utilizes a service in a Client to Authenticator Protocol (CTAP) communication.

A determination as to whether to permit the user to utilize the service may be performed by authenticating with the information processing apparatus 100.

The determination as to whether permit the user to utilize the service may be performed by requesting an authentication device to authenticate the authentication information and acquiring authentication results from the authentication device. Specifically, the authentication device may be an FIDO server (such as FIDO server 2).

The terminal apparatus 250 of the exemplary embodiment in FIG. 1B has a function of performing a wireless communication process with the information processing apparatus 100 the user 210 is trying to utilize. Referring to FIG. 1B, the terminal apparatus 250 includes, at least, a processor 255, memory 260, communication device 288, and bus 298 that interconnects these elements to exchange data. The terminal apparatus 250 may further include an outputter 278 and receiver 282. The processor 255, memory 260, outputter 278, receiver 282, and communication device 288 exchange data via the bus 298.

A block diagram in FIG. 1B illustrates a hardware configuration of a computer that implements the terminal apparatus 250 of the exemplary embodiment. The hardware configuration of the computer that executes a program of the exemplary embodiment is the computer in FIGS. 1B and 1*s* specifically the computer that may work as a mobile information communication apparatus. Specifically, the processor 255 is used as a processor and the memory 260 is used as a memory.

The functions of the processor 255, memory 260, outputter 278, receiver 282, communication device 288, and bus 298 in the terminal apparatus 250 respectively correspond to and are respectively identical in function to the functions of the processor 105, memory 110, outputter 185, receiver 190, communication device 195, and bus 198 in the information processing apparatus 100. Similarly, an ID information memory module 267 corresponds to and is identical in function to the data memory 120, a program memory 270 corresponds to and is identical in function to the program memory 140, a display 280 corresponds to and is identical in function to the display 187, an instruction receiver 284 corresponds to and is identical in function to the instruction receiver 192, and a wireless communication module 290 corresponds to and is identical in function to the wireless communication module 195A. In response to an operation of the user 210 of the instruction receiver 284 also serving as a shutter, a camera 286 photographs the code image (the code image displayed on the information processing apparatus 100) as a digital image. The code image photographed by the camera 286 is transferred to a code image analyzing module 272. The terminal apparatus 250 as a mobile information communication apparatus has an appropriate size that allows humans to carry the terminal apparatus 250.

The ID information memory module 267 stores the identification information on the information processing apparatus 100 extracted from the code image by the code image analyzing module 272.

The code image analyzing module 272 receives the code image captured by the camera 286, analyzes the code image, and extracts the identification information on the information processing apparatus 100 embedded in the code image.

By communicating information including the identification information, the wireless communication control module 274 performs control to receive a connect request from the information processing apparatus 100 via the wireless communication module 290 (an example of a second communication unit) and establish connection to the information processing apparatus 100. The wireless communication control module 274 performs wireless communication with the wireless communication control module 144 in the information processing apparatus 100. The wireless communication corresponds to BLE.

The communication device 288 may also additionally perform communication via wireless phone or via the Internet over the wireless network.

Figure 2:
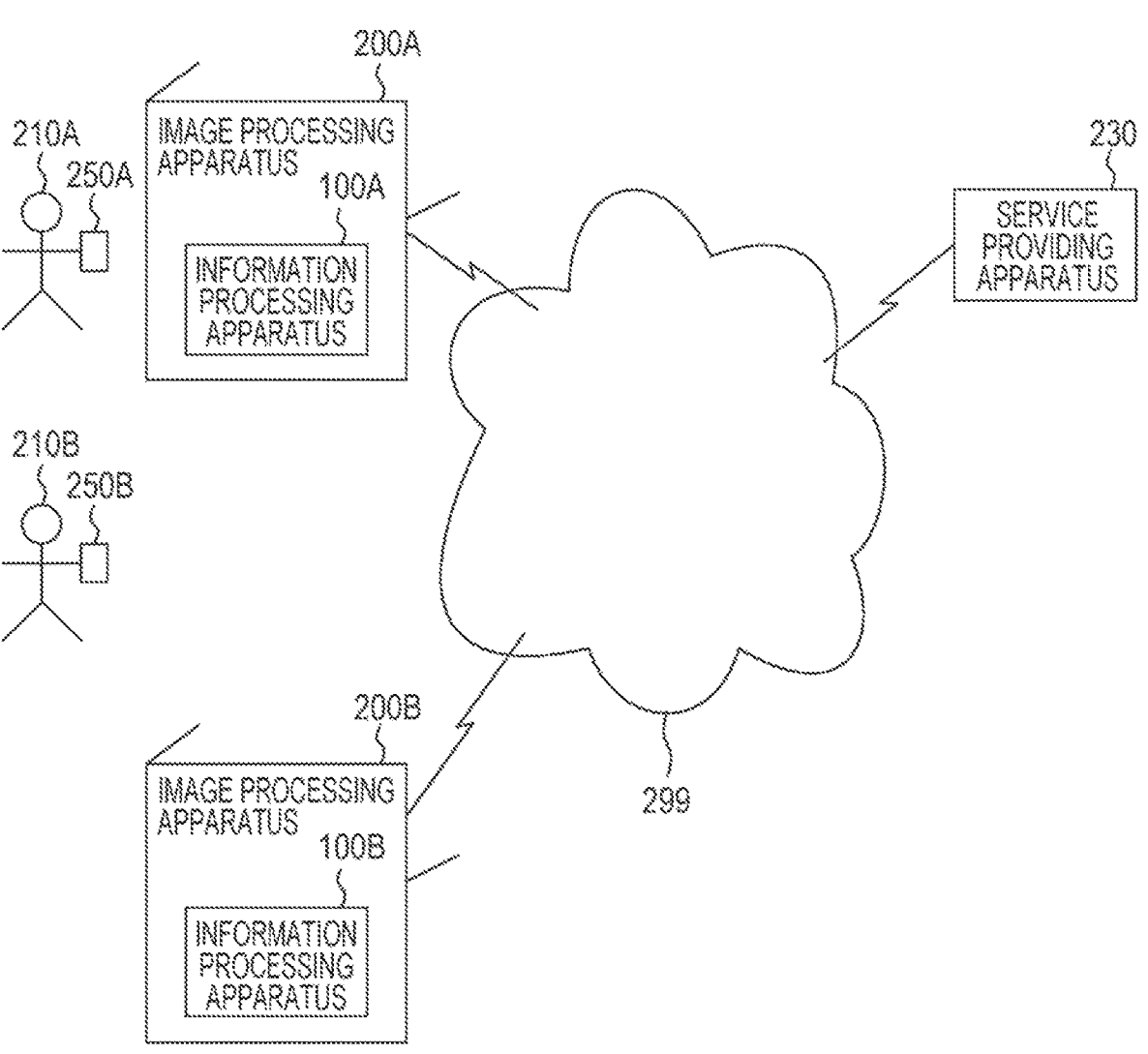
FIG. 2 illustrates a system configuration of the exemplary embodiment.

FIG. 2 illustrates a system configuration of the exemplary embodiment.

An image processing apparatus 200 includes the information processing apparatus 100. In the illustrated example, the information processing apparatus 100 serves as an image processing apparatus.

The user 210 holds the terminal apparatus 250. The terminal apparatus 250 is a mobile information communication apparatus held by the user 210 and has a camera function. The terminal apparatus 250 may read the code image displayed on the display 187 in the information processing apparatus 100.

The image processing apparatuses 200A, 200B, and 200C are interconnected to each other via a communication network 299. The communication network 299 may be a wireless network, a wired network, or a combination thereof. For example, the communication network 299 may be the Internet as a communication infrastructure and/or an intranet.

The service providing apparatus 230 provides a service to the terminal apparatus 250 (or the user 210) via the image processing apparatus 200. The service includes storing a document printed by the image processing apparatus 200 and/or storing a document read by the image processing apparatus 200. The function of the service providing apparatus 230 may be implemented as a cloud service.

When the image processing apparatus 200 is wirelessly connected to the terminal apparatus 250 via BLE, the terminal apparatus 250 is not necessarily connected to the nearest image processing apparatus 200. For example, even when a user 210A having the terminal apparatus 250A approaches the image processing apparatus 200A to utilize the image processing apparatus 200A, the terminal apparatus 250A may not necessarily be connected to the image processing apparatus 200A but the terminal apparatus 250B held by a user 210B may be connected to the image processing apparatus 200A.

The image processing apparatus 200A first displays the code image having the identification information on the image processing apparatus 200A (the information processing apparatus 100A) embedded therewithin. In such a case, only the terminal apparatus 250A held by the user 210A close enough to operate the image processing apparatus 200A may read the identification information. The terminal apparatus 250A and 250B perform beacon communication to connect to the image processing apparatus 200 (not necessarily the image processing apparatus 200A). If the identification information on the image processing apparatus 200A is included in the beacon communication, the BLE connection is established with the image processing apparatus 200A. Referring to FIG. 2, the BLE connection is established between the image processing apparatus 200A and the terminal apparatus 250A but not established between the image processing apparatus 200A and the terminal apparatus 250B. This is because the beacon of the terminal apparatus 250B does not include the identification information on the image processing apparatus 200A and because the code image displayed on the image processing apparatus 200A is not read.

Figure 3:
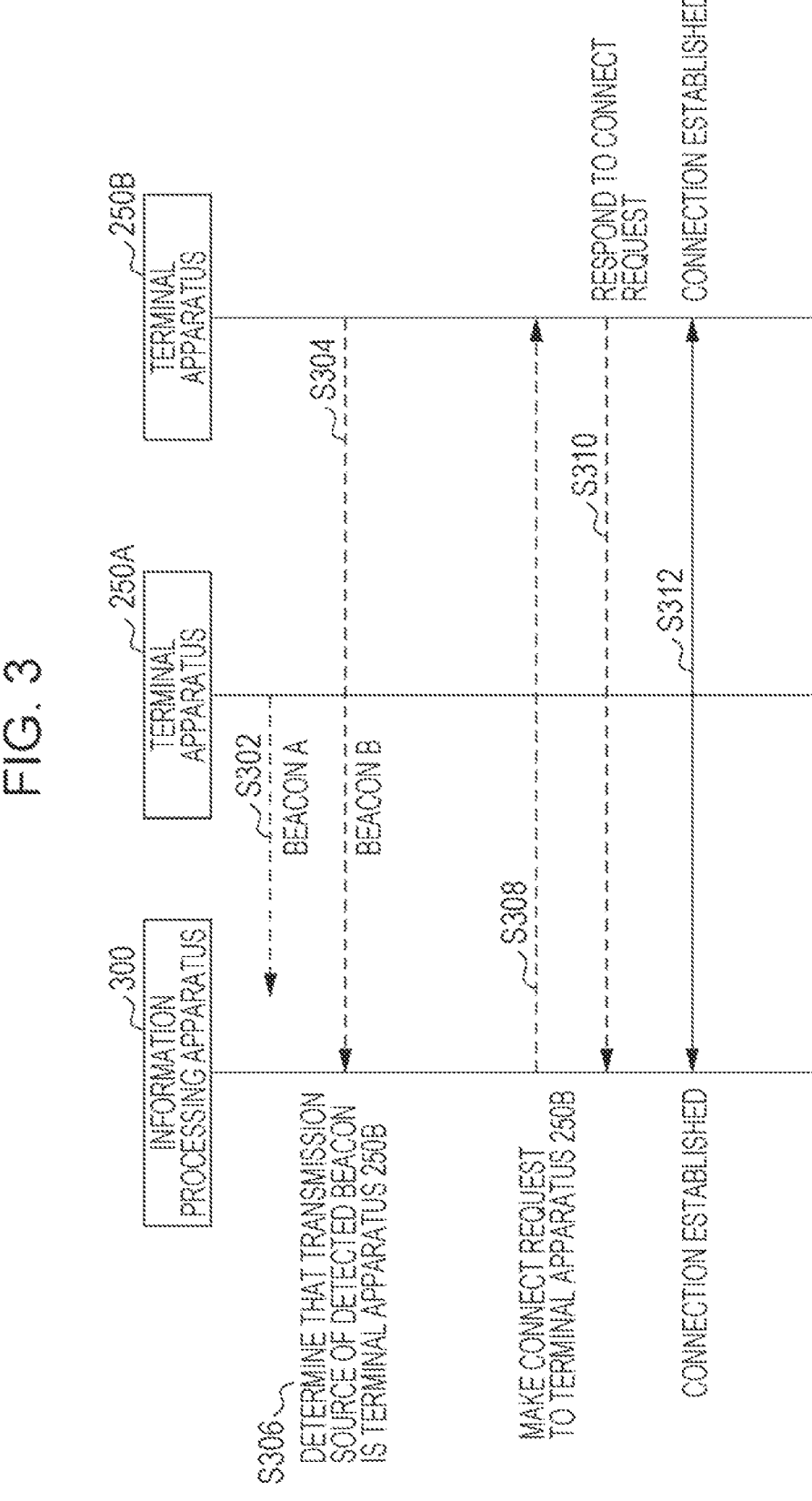
FIG. 3 illustrates an example of a connection process performed between an image processing apparatus and a terminal apparatus without using the exemplary embodiment.

FIG. 3 illustrates an example of a connection process in which the image processing apparatus 300 and the terminal apparatus 250 are connected to each other without employing the exemplary embodiment. Specifically, the image processing apparatus 300 does not display the code image having the identification information on the image processing apparatus 300 embedded therewithin.

Via BLE, a broadcast packet as an advertising packet is received and a corresponding terminal is identified by analyzing the packet.

If multiple terminal apparatuses 250 are present around the image processing apparatus 300 installed at an office, the image processing apparatus 300 has difficulty in determining whether a terminal apparatus 250 detected by the image processing apparatus 300 is held by the user 210A who is actually in front of the image processing apparatus 300. This suggests the possibility of erroneous connection. The position detection based on the strength of a received radiowave in Bluetooth has a relatively low accuracy and determining the nearest terminal apparatus 250 based on the strength of the received radiowave alone is difficult. Specifically, if the user 210B near the image processing apparatus 300 starts up the same application as the terminal apparatus 250A, the terminal apparatus 250B may possibly be detected.

An example of the erroneous connection is described with reference to FIG. 3. The user 210A having the terminal apparatus 250A (the user 210A is in front of the image processing apparatus 300) may be going to utilize the image processing apparatus 300 and the user 210B having the terminal apparatus 250B may happen to pass by the image processing apparatus 300. Both the terminal apparatus 250A and the terminal apparatus 250B have started up an application to use the image processing apparatus 300.

The specifications of Client to Authenticator Protocol (CTAP 2) used in Fast Identity Online 2 (FIDO 2) specify that an authenticator (the terminal apparatus 250) transmits an advertising packet including universally unique identifier (UUID) of FIDO, and that a browser (the image processing apparatus 300) searches for the terminal apparatus 250

(FIDO UUID) and makes a connection. A process complying with the specifications of CTAP 2 of FIDO 2 is performed.

In step S302, the terminal apparatus 250A emits a beacon A. This corresponds to the transmission of the advertising packet. It is assumed that the beacon A is not received by the image processing apparatus 300.

In step S304, the terminal apparatus 250B emits a beacon B. This corresponds to the transmission of the advertising packet. It is assumed that the beacon B is received by the image processing apparatus 300.

In step S306, the image processing apparatus 300 determines that the transmission source of the detected beacon is the terminal apparatus 250B.

In step S308, the image processing apparatus 300 makes a connect request to the terminal apparatus 250B.

In step S310, the terminal apparatus 250B responds to the connect request.

In step S312, a connection is established between the image processing apparatus 300 and the terminal apparatus 250B.

In this way, the image processing apparatus 300 may possibly receive the advertising packet of the beacon emitted by the terminal apparatus 250B and the image processing apparatus 300 is not necessarily connected to the nearest terminal apparatus 250 (originally intended terminal apparatus 250A).

The image processing apparatus 300 is to be wirelessly connected to the nearest terminal apparatus 250 (the terminal apparatus 250 of the user 210 who is in front of the image processing apparatus 300 to use the image processing apparatus 300). In the discussion that follows, the image processing apparatus 300 of the exemplary embodiment performs a process that may reduce the possibility of the wireless communication that the image processing apparatus 300 of the exemplary embodiment performs wireless communication with a terminal apparatus other than the terminal apparatus held by a user near the image processing apparatus 300.

A network service may be utilized via the image processing apparatus 300 installed at a public place. When a user identification (ID) or password is entered onto an operation screen of the image processing apparatus 300, a mechanism is provided to control a risk that a user ID or password is stolen by a third party. In the mechanism, the terminal apparatus 250 performs authentication and sends verification results to the image processing apparatus 300. If the verification results are authenticated by an authentication system, an access token is issued.

If authentication modules of multiple terminal apparatuses 250 are detected, an authentication method or a communication method may be displayed on the screen of the image processing apparatus 300 to identify an authentication module and the user 210 having the terminal apparatus 250 may manually select one of the authentication methods and communication methods.

Since the right of usage of the user 210 having the terminal apparatus 250 is not registered on the image processing apparatus 300 installed at the public place, the terms of usage of the user 210 is not switched to a service or billing method provided by the image processing apparatus 300.

According to the exemplary embodiment, the image processing apparatus 300 automatically determines the terminal apparatus 250 (authentication module) held by the user 210 who wants to utilize the image processing apparatus 300 and is BLE connected to the terminal apparatus 250. The erroneous connection is thus controlled and the user 210 may be free from an operation selecting the authentication method to identify the authentication module and an operation selecting the communication method.

The right of usage of the user 210 having the terminal apparatus 250 connected to the image processing apparatus 300 is identified before the authentication process performed by the FIDO server 565. The service to be provided and billing method may be automatically switched and operation assistance responsive to the right of usage may thus be provided.

Figure 4:
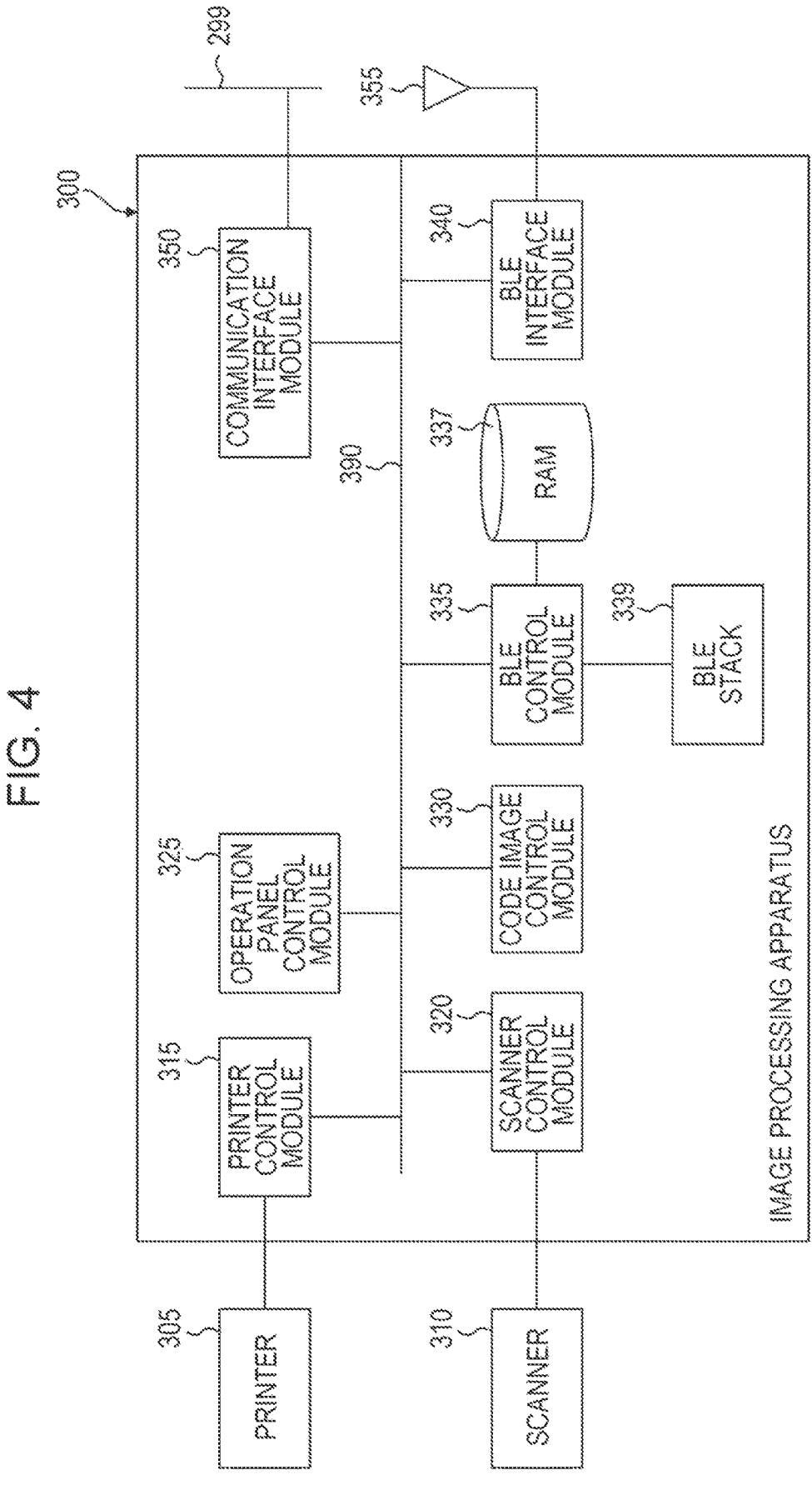
FIG. 4 illustrates a specific example of the system configuration of the exemplary embodiment.

FIG. 4 specifically illustrates a system configuration implementing the exemplary embodiment.

The image processing apparatus 300 incudes a printer control module 315, scanner control module 320, operation panel control module 325, code image control module 330, BLE control module 335, random-access memory (RAM) 337, BLE stack 339, BLE interface module 340, and communication interface module 350. The image processing apparatus 300 is a specific example of the information processing apparatus 100 (or the image processing apparatus 200).

The printer control module 315, scanner control module 320, operation panel control module 325, code image control module 330, BLE control module 335, BLE interface module 340, and communication interface module 350 are interconnected to each other via a bus 390.

The image processing apparatus 300 is connected to a printer 305 and scanner 310.

The printer 305 is connected to the printer control module 315. The printer control module 315 controls a print process of the printer 305.

The scanner 310 is connected to the scanner control module 320. The scanner control module 320 controls a read process of the scanner 310.

The operation panel control module 325 controls a panel enabled to display and receive an operation. For example, the operation panel control module 325 displays on the panel the code image having the identification information on the image processing apparatus 300 embedded therewithin, receives an operation of the user 210 on the image processing apparatus 300, and displays process results of the image processing apparatus 300.

The code image control module 330 is an example of the code image generation module 142.

The BLE control module 335 is connected to the RAM 337 and BLE stack 339. The BLE control module 335 is an example of the wireless communication control module 144. Specifically, the BLE control module 335 controls BLE communication and CTAP communication for FIDO server authentication.

The RAM 337 is connected to the BLE control module 335. The RAM 337 stores a local name, one-time password, tenant ticket information, and the like.

The BLE stack 339 is connected to the BLE control module 335. The BLE stack 339 stores a collection of protocols for the BLE communication and is hierarchically structured. One communication includes multiple protocols. Each protocol communicates with an upper layer protocol and a lower layer protocol. The bottom layer protocol is used to communicate with hardware. As a layer becomes higher, more functions of the protocol are added.

The communication interface module 350 is connected to the communication network 299. The communication interface module 350 is an example of the wired communication module 195B. Specifically, the service providing apparatus 230 (and the FIDO server as well) is connected to the Internet.

The BLE interface module 340 is connected to the BLE antenna 355 and controlled by the BLE control module 335. The BLE interface module 340 and BLE antenna 355 are examples of the wireless communication module 195A.

Figure 5:
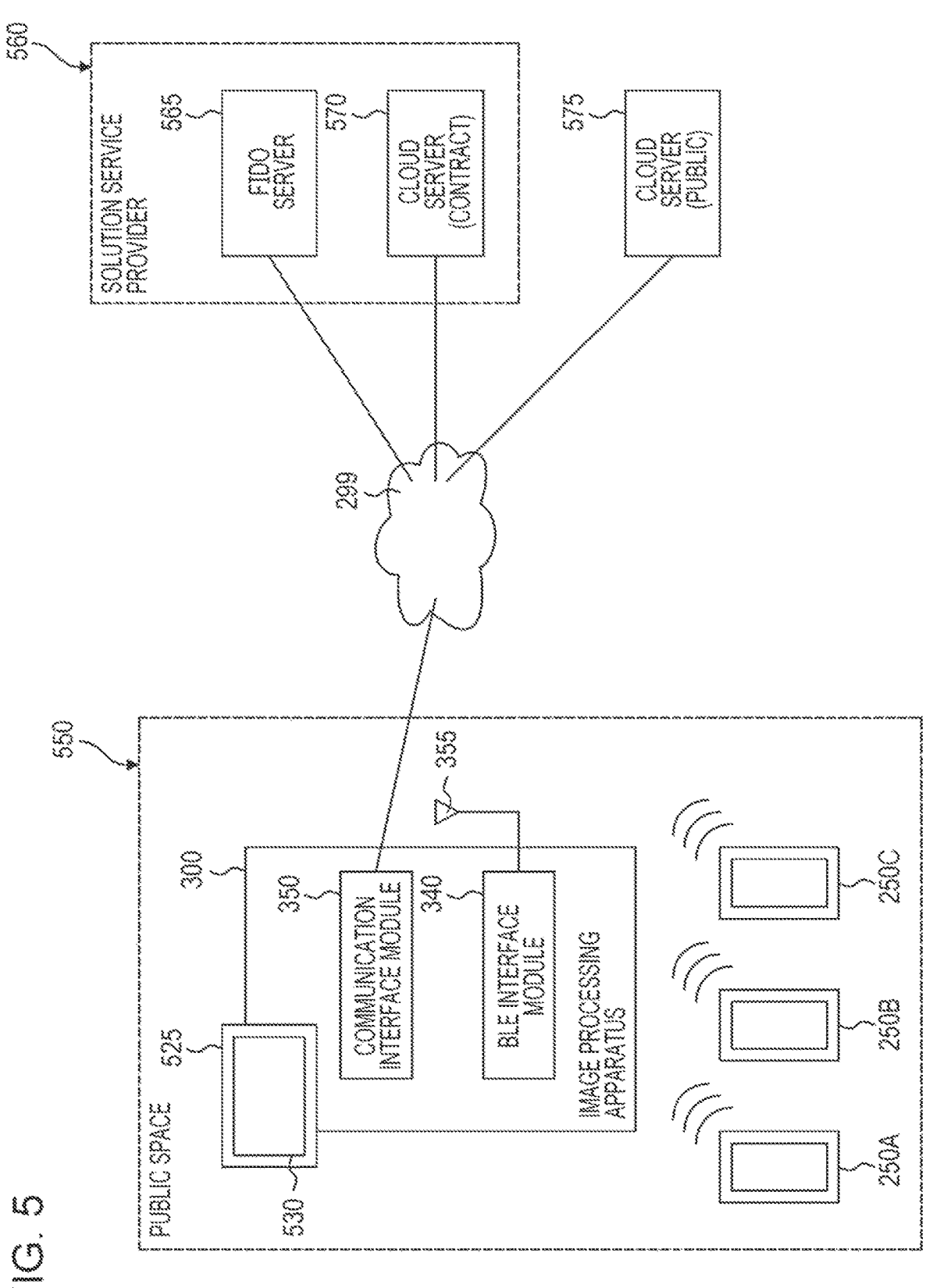
FIG. 5 illustrates a system configuration including specific apparatuses related to the exemplary embodiment.

FIG. 5 illustrates a system configuration including specific apparatuses of the exemplary embodiment.

The terminal apparatus 250 (corresponding to the authentication module in FIDO) held by the user 210 who wants to utilize the image processing apparatus 300 is automatically determined and the BLE connection to the terminal apparatus 250 is made. The erroneous connection is controlled and an operation selecting the authentication method to identify the authentication module and an operation selecting the communication method may thus be dispensed with.

The right of usage of the user 210 having the terminal apparatus 250 connected to the image processing apparatus 300 is identified before the authentication process performed by the FIDO server 565. The service to be provided and billing method may be automatically switched and operation assistance responsive to the right of usage may thus be provided. Specifically, time until the start of a service usage may be shortened and a procedure for a cloud connection and billing method may be displayed on a panel 525 in an easy-to-understand guide.

The image processing apparatus 300 is configured as illustrated in FIG. 4. FIG. 5 illustrates the panel 525. The image processing apparatus 300 further includes a BLE interface module 340 for communication and communication interface module 350. A code image 530 is displayed on the panel 525.

The image processing apparatus 300 is installed at a public space 550. The user 210A, user 210B, and user 210C are within the public space 550. The user 210A has the terminal apparatus 250A, the user 210B has the terminal apparatus 250B, and the user 210C has the terminal apparatus 250C.

A solution service provider 560 connected to the image processing apparatus 300 via a communication network 299 includes an FIDO server 565 and cloud server (contract) 570.

If authentication has been successfully performed on the FIDO server 565 via FIDO 2, the FIDO server 565 transmits an access token to connect to the cloud server (contract) 570.

The cloud server (contract) 570 performs a service provided by the solution service provider 560. The service is provided to a predetermined user group. The user group may be a group of users who belong to an organization, such as a company or a group of users who participate in a project across the group. The user group is a tenant in the following discussion. For example, a user in the tenant may be a user of a business client that is in contract with the usage of the image processing apparatus 300.

The cloud server (public) 575 is a public cloud server that is normally available to a user connected to the Internet. For example, the cloud server (public) 575 provides services including storing a file and receiving or transmitting email.

The image processing apparatus 300 (the BLE interface module 340) is connectable via BLE connection to the terminal apparatuses 250A, 250B, and 250C.

The image processing apparatus 300 (the communication interface module 350) is communicably connected to the FIDO server 565, cloud server (contract) 570, and cloud server (public) 575 via the communication network 299.

The terminal apparatus 250 is connected via the BLE connection to the image processing apparatus 300 and communicates via the image processing apparatus 300 with the FIDO server 565, cloud server (contract) 570, and cloud server (public) 575. The terminal apparatus 250 is provided with service by the cloud server (contract) 570 and cloud server (public) 575. The terminal apparatus 250 includes an authentication module that performs biometric authentication, a wireless interface that performs the BLE connection, and a camera.

The system in FIG. 5 performs a process described below. The following description is intended to help understand the exemplary embodiment more easily and is not intended to limit the scope of the disclosure.

The image processing apparatus 300 displays on the panel 525 the code image 530, such as a QR code, and the terminal apparatus 250 reads the code image 530 via the camera function thereof.

The code image 530 includes information identifying the image processing apparatus 300, information on a list of cloud services available from the image processing apparatus 300, and a one-time password that is used to encrypt information transferred from the terminal apparatus 250 to the image processing apparatus 300.

The terminal apparatus 250 transmits to the image processing apparatus 300, via a BLE advertising beacon, information identifying the image processing apparatus 300 read from the code image 530, information on the cloud services available from the image processing apparatus 300, and a tenant ticket of the user encrypted with a one-time password. The terminal apparatus 250 may also transmit information identifying the terminal apparatus 250. The tenant ticket includes information indicating the tenant which the user belongs to and the service available for the user. The tenant ticket is also referred to as service contract information.

The image processing apparatus 300 scans the BLE advertising beacon of the terminal apparatus 250. If the identification information on the image processing apparatus 300 is included in the BLE advertising beacon, the image processing apparatus 300 is connected to the terminal apparatus 250 via the BLE connection. The right of usage of the user is determined in accordance with the encrypted tenant ticket of the user. In the BLE connection, the identification information on the terminal apparatus 250 may be utilized.

The user may utilize the system as described below.

The user 210A may scan a document contracted at a business destination on the image processing apparatus 300 installed at a shared office (the public space 550) which the user 210A drops by and the user 210A may store data on the cloud server (contract) 570 in the solution service provider 560 used at the office of the user 210A.

The solution service provider 560 including the FIDO server 565 provides a service. In the service, an access token of the cloud server (contract) 570 is issued by transmitting via the BLE connection to the image processing apparatus 300 results of biometric authentication performed by the terminal apparatus 250 held by the user 210 and login is thus performed on the cloud server (contract) 570 without inputting the password.

The user 210A has registered an account for the FIDO server 565 in advance and is thus a contract user of the solution service provider 560. The user 210A is going to the business destination after having received a service ticket and storing the service ticket on the terminal apparatus 250A.

When the user 210A stands in front of the image processing apparatus 300 at the shared office and issues an instruction to use the image processing apparatus 300, the code image 530 (e.g., the QR code) is displayed on the panel 525. When the user 210A starts up an application of the terminal apparatus 250A and reads the code image 530, the user 210A is requested to perform biometric authentication on the terminal apparatus 250A. The user 210A performs biometric authentication. The user 210A performs biometric authentication and if the user 210A is successfully authenticated, a folder of the cloud server (contract) 570 used in the office of the user 210A is displayed. When the document is scanned on the image processing apparatus 300, the data is stored. When the data transmission is complete, the code image 530 is displayed again.

The user 210B may run a private store. On the image processing apparatus 300 shared and installed at a shared office which the user 210B drops by, the user 210B may now print catalogues or leaflets to be distributed to customers. The user 210B does not make a cloud service contract with the solution service provider 560 but has an account registered with the FIDO server 565. The user 210B has registered with the cloud server (public) 575 that the user 210B normally utilizes.

When the user 210B stands in front of the image processing apparatus 300 in the shared office and enters an instruction for use, the code image 530 is displayed on the panel 525. The user 210B starts an application on the terminal apparatus 250B and reads the code image 530. The user 210B is requested to perform biometric authentication on the terminal apparatus 250B. The user 210B performs the biometric authentication and if the user 210B is successfully authenticated, the available cloud server (public) 575 and the billing method are displayed. When settings are complete, the catalogues or leaflets stored on the cloud server (public) 575 are printed on the image processing apparatus 300.

The user 210A having the terminal apparatus 250A may have an FIDO account and may be a member of a predetermined tenant. Specifically, the user 210A has made a usage contract of a service provided by the solution service provider 560 and has registered an account with the cloud server (contract) 570.

The user 210B having the terminal apparatus 250B has an FIDO account but is not a member of the tenant. Specifically, the user 210B normally utilizes the cloud server (public) 575 and has registered an account with the cloud server (contract) 570 in the solution service provider 560.

The user 210C having the terminal apparatus 250C does not have an FIDO account. Specifically, the user 210C has not registered an account with the cloud server (contract) 570. Note that a question whether the user 210*c* is a usage contractor of the service provided by the solution service provider 560 is not asked.

On the condition described above, examples of processes of the system including the terminal apparatus 250, image processing apparatus 300, solution service provider 560, FIDO server 565, cloud server (contract) 570, and cloud server (public) 575 are described with reference to FIGS. 6, 7A, 7B, 9A and 9B.

Figure 6:
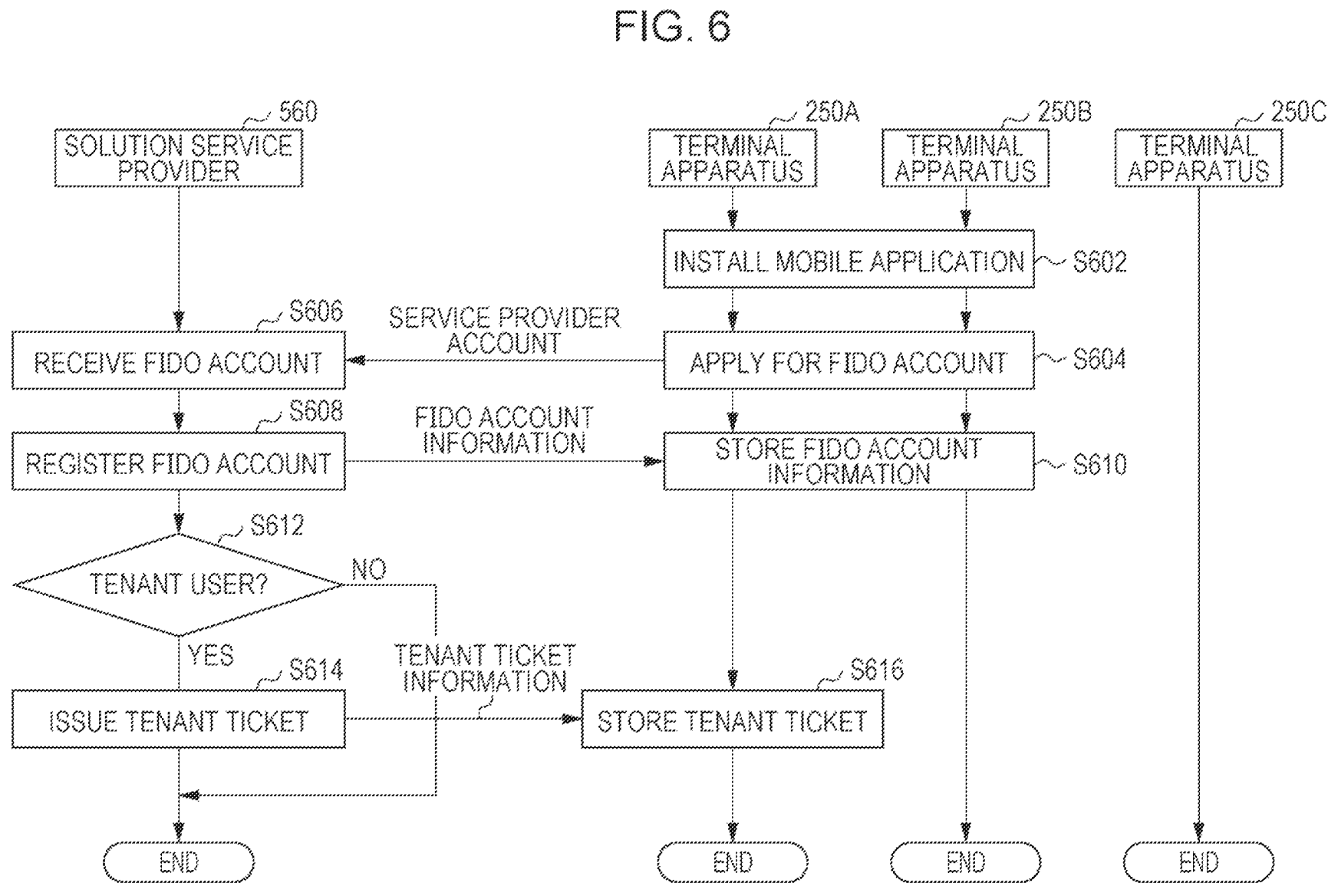

FIG. 6 is a flowchart illustrating an example of a process of the exemplary embodiment. FIG. 6 illustrates the process of FIDO account registration of the solution service provider 560 (the FIDO server 565). The process is performed prior to the utilization of the image processing apparatus 300.

The process is performed by the solution service provider 560 (the FIDO server 565), terminal apparatus 250A, and terminal apparatus 250B.

The user 210A having the terminal apparatus 250A applies for an FIDO account on the solution service provider 560 (the FIDO server 565) and a tenant ticket serving as information used to utilize the cloud server (contract) 570 is issued.

The user 210B having the terminal apparatus 250B applies for an FIDO account on the solution service provider 560 (the FIDO server 565) and a tenant ticket used to utilize the cloud server (contract) 570 is not issued.

The user 210C having the terminal apparatus 250C does not do anything on the solution service provider 560 (the FIDO server 565) and has no FIDO account. No tenant ticket is issued for the user 210C.

In step S602, mobile applications are installed on the terminal apparatus 250A and terminal apparatus 250B. The mobile applications are software programs used to perform the processes in FIG. 6 and FIGS. 7A and 7B and FIGS. 9A and 9B.

In step S604, the terminal apparatuses 250A and 250B apply for the FIDO account on the solution service provider 560 by transmitting service provider accounts thereof.

In step S606, the solution service provider 560 receives the FIDO accounts respectively from the terminal apparatuses 250A and 250B.

Specifically in the operations in steps S604 and S606, the installed mobile applications apply for the FIDO accounts on the FIDO server 565 in the solution service provider 560. The terminal apparatus 250A includes into account application information (service provider account) a registered ID of a service (the cloud server (contract) 570) contracted for use. The terminal apparatus 250B includes into account application information (service provider account) registration information on a normally used public cloud (the cloud server (public) 575).

In step S608, the solution service provider 560 registers the FIDO accounts and transmits FIDO account information respectively to the terminal apparatuses 250A and 250B.

In step S610, the terminal apparatuses 250A and 250B store the FIDO account information thereof.

In the operations in steps S608 and S610, if there is no problem with the application for the FIDO account, the account registration is performed on the FIDO server 565 and the access token is stored for connection to the cloud server (contract) 570. The mobile applications of the terminal apparatuses 250A and 250B store the FIDO account information (e.g., server URL and user ID), provided by the solution service provider 560, on non-volatile memories respectively within the terminal apparatuses 250A and 250B.

In step S612, the solution service provider 560 determines whether the user is a tenant user. If the user is a tenant user, the process proceeds to step S614; otherwise, the process ends. In this example, the user 210A (having the terminal apparatus 250A) is a tenant user but the user 210B (having the terminal apparatus 250B) is not a tenant user.

In step S614, the solution service provider 560 issues a tenant ticket to the user 210A and transmits information on the tenant ticket to the terminal apparatus 250A. The information on the tenant ticket may include not only the tenant ticket to utilize the cloud server (contract) 570 but also contract information.

In step S616, the terminal apparatus 250A stores the tenant ticket received from the solution service provider 560.

Specifically in the operations in steps S612 through S616, the tenant ticket is issued to the terminal apparatus 250A of a usage contractor (the user 210A) of the service provided by the solution service provider 560 and is stored on the non-volatile memory of the terminal apparatus 250A.

Figure 7A:
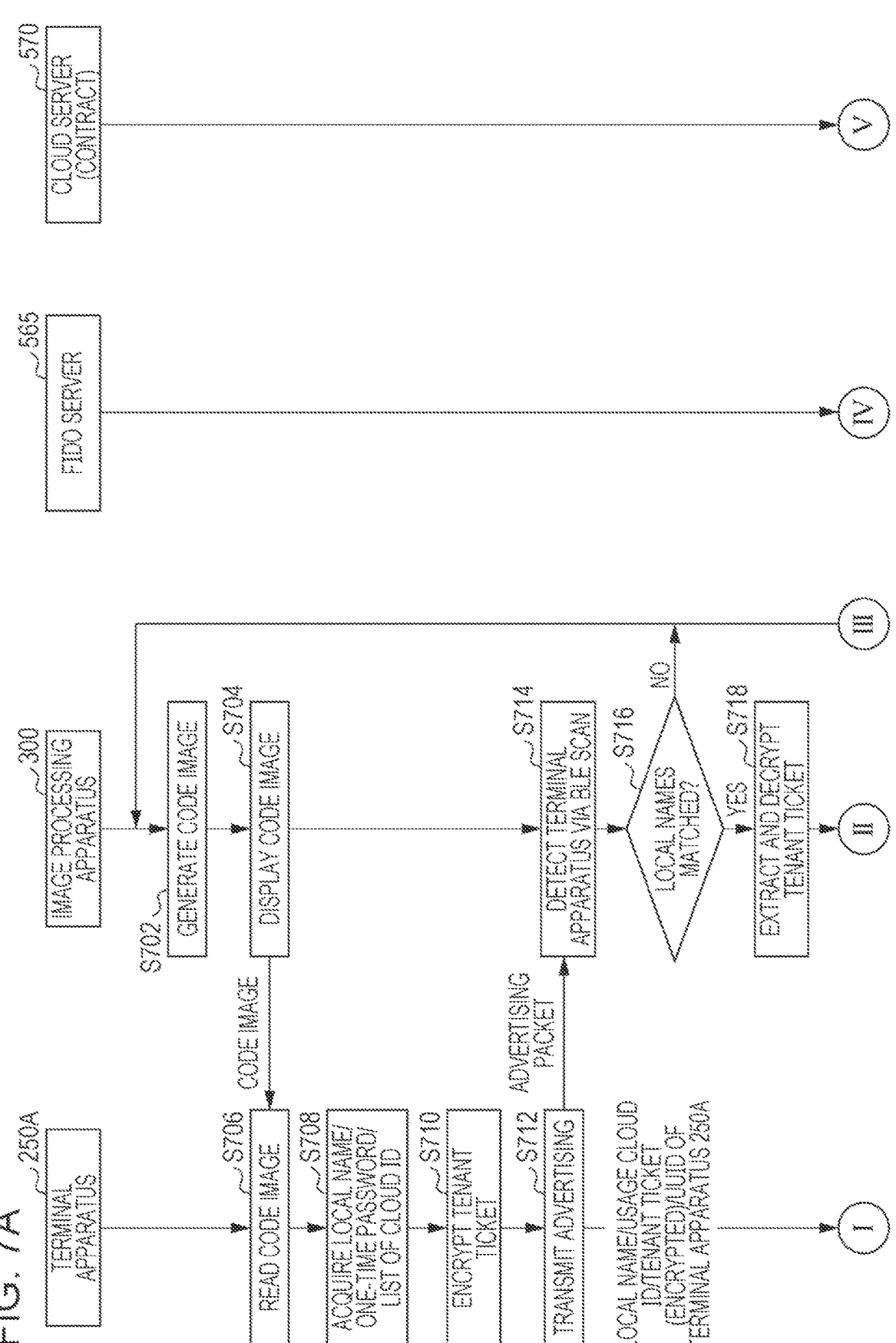
FIG. 7A is a flowchart illustrating an example of a process of the exemplary embodiment.
Figure 7B:
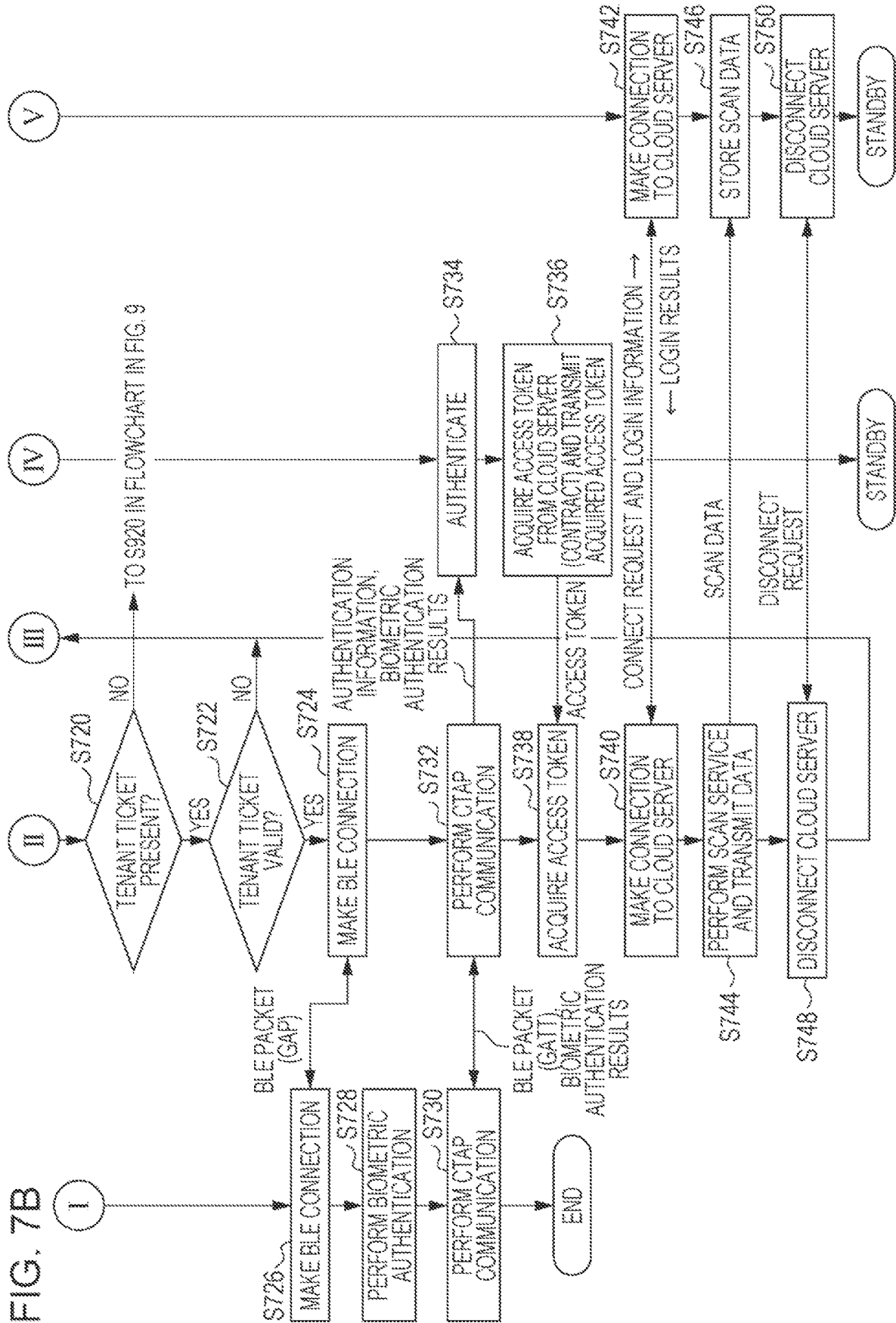
FIG. 7B is a flowchart illustrating an example of a process of the exemplary embodiment.

FIGS. 7A and 7B are a flowchart illustrating an example of a process of the exemplary embodiment. In the process, the system is utilized by the usage contractor (the user 210A) of a service (the cloud server (contract) 570) provide by the solution service provider 560. The process is performed by the terminal apparatus 250A, image processing apparatus 300, FIDO server 565, and cloud server (contract) 570.

In step S702, the image processing apparatus 300 generates a code image. For example, the image processing apparatus 300 generates the code image 530 having connection information 800 embedded therewithin. FIG. 8 illustrates a data structure of the connection information 800. The connection information 800 includes a local name column 802, one-time password column 804, cloud service count column 806, and cloud ID column 808. The local name column 802 stores a local name serving as identification information uniquely identifying the image processing apparatus 300 in the exemplary embodiment. The one-time password column 804 stores a one-time password used to encrypt the tenant ticket. The cloud service count column 806 stores a cloud service count. The cloud ID column 808 stores cloud IDs (a list of cloud IDs) corresponding to the cloud service count. The cloud ID is identification information uniquely identifying a cloud service (or a cloud server) in the exemplary embodiment.

In step S704, the image processing apparatus 300 displays the code image. Specifically, the image processing apparatus 300 detects a user with a human sensor. When the user (in this case, the user 210A) stands in front of the image processing apparatus 300 and gives an instruction to "perform authentication on the mobile terminal," the image processing apparatus 300 displays the code image 530 on the panel 525.

In step S706, the terminal apparatus 250A reads the code image 530 on the panel 525.

In step S708, the terminal apparatus 250A retrieves information on the local name, one-time password, and a list of available cloud IDs.

Specifically in the operations in steps S706 and S708, the terminal apparatus 250A reads with a camera function (the camera 286) the code image 530 displayed on the panel 525 in the image processing apparatus 300 and acquires information on the local name, one-time password, and the list of available cloud IDs, The terminal apparatus 250A displays to the user 210A the available cloud services in a selectable way and allows the user 210A to select a cloud service the user 210A wants to utilize.

The information on the list of available cloud IDs may not be necessarily displayed and allowed to be selected if the available cloud services are fixed or the number of available cloud services is only one. If the available cloud services are not fixed and more than one, the terminal apparatus 250A may allow the user 210A to select one from the cloud services by displaying the cloud services on the terminal apparatus 250A.

In step S710, the terminal apparatus 250A encrypts the tenant ticket.

In step S712, the terminal apparatus 250A transmits advertising to the image processing apparatus 300. For example, the advertising includes a local name, usage cloud ID, encrypted tenant ticket, and universally unique identifier (UUID) of the terminal apparatus 250A.

In the operations in steps S710 and S712, the terminal apparatus 250A encrypts with the one-time password the tenant ticket provided beforehand by the solution service provider 560, and transmits a BLE advertising beacon that is a combination of information on the local name and usage cloud ID and UUID serving as information identifying the terminal apparatus 250A.

In step S714, the image processing apparatus 300 detects a terminal apparatus 250 via BLE scan.

In step S716, the image processing apparatus 300 determines whether local names match. If the local names match, the process proceeds to step S718; otherwise, the process returns to step S702.

Specifically in the operations in steps S714 and S716, the image processing apparatus 300 searches for an advertising packet of the terminal apparatus 250 via the BLE scan and selects the terminal apparatus 250 (in this case, the terminal apparatus 250A) matching the local name included in the code image 530.

The image processing apparatus 300 extracts UUID and tenant ticket of the terminal apparatus 250A having a matched local name, and the cloud server ID and store these pieces of information on the memory (RAM).

If no terminal apparatus 250 having the matched local name has been detected through a predetermined period of time of BLE scan, the process returns to step S702 to generate the code image 530. The image processing apparatus 300 then waits for a request of a next user who utilizes the image processing apparatus 300 next.

In step S718, the image processing apparatus 300 extracts the tenant ticket and encrypts the extracted tenant ticket.

In step S720, the image processing apparatus 300 determines whether there is a tenant ticket. If there is a ticket, the process proceeds to step S722; otherwise, the process proceeds to step S920 in a flowchart in FIG. 9B.

In step S722, the image processing apparatus 300 determines whether the tenant ticket is valid. If the tenant ticket is value, the process proceeds to step S724; otherwise, the process returns to step S702.

Specifically in the operations in steps S718 through S722, the tenant ticket of the terminal apparatus 250A is decrypted, and if the tenant ticket is valid, the image processing apparatus 300 shifts to generic access profile (GAP) communication status of the BLE connection.

Figure 9A:
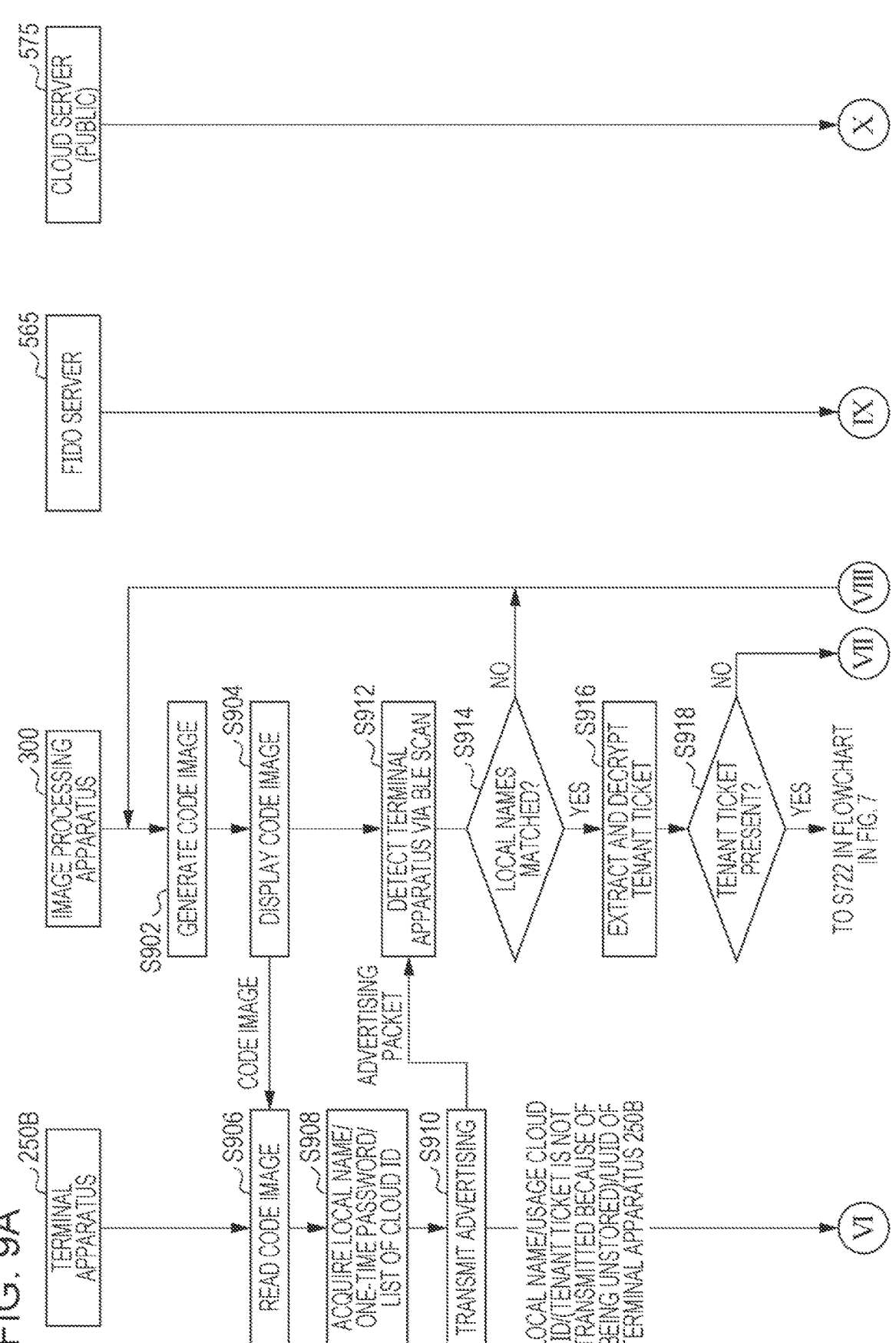
FIG. 9A is a flowchart illustrating an example of a process of the exemplary embodiment.
Figure 9B:
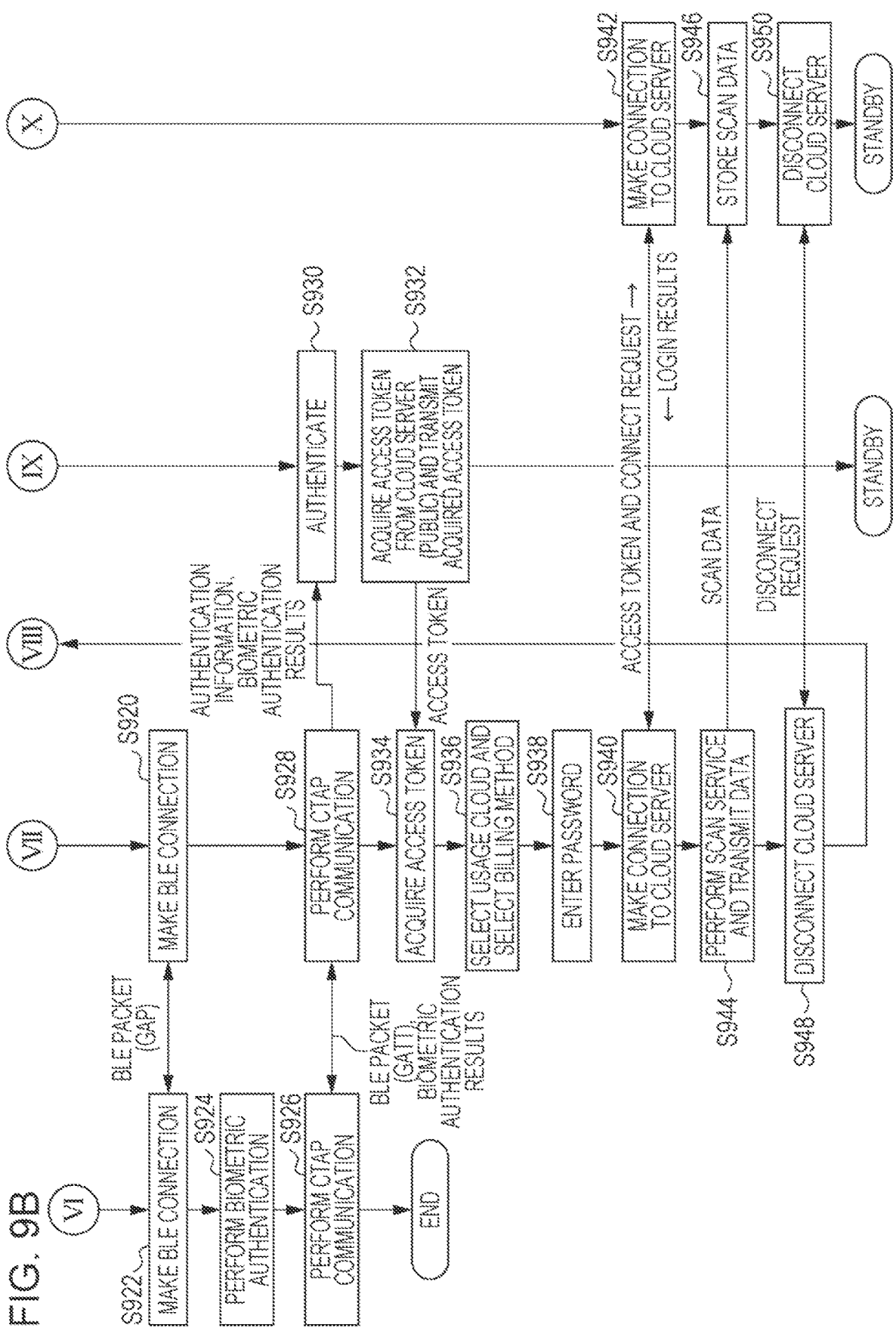
FIG. 9B is a flowchart illustrating an example of a process of the exemplary embodiment.

If no tenant ticket is extracted, the image processing apparatus 300 shifts to a usage service status in accordance with the flowchart in FIGS. 9A and 9B (the process in step S920 and thereafter). In the usage service status, the image processing apparatus 300 is enabled to provide the usage service that is available to the terminal apparatus 250B.

If the decrypted tenant ticket is determined to be invalid, the image processing apparatus 300 displays a message indicating unavailability on the panel 525. The process returns to step S702 and waits for a next user who utilizes the image processing apparatus 300.

In steps S724 and S726, the image processing apparatus 300 and the terminal apparatus 250A perform the BLE connection and exchange BLE packets (GAP).

Specifically, the terminal apparatus 250A performs BLE pairing with the image processing apparatus 300. If successfully paired, the terminal apparatus 250A is BLE connected to the image processing apparatus 300.

In step S728, the terminal apparatus 250A performs biometric authentication.

In step S730, the terminal apparatus 250A performs CTAP communication with the image processing apparatus 300 and transmits a BLE packet (Generic Attribute Profile (GATT)) and biometric authentication results.

In step S732, the image processing apparatus 300 transmits authentication information and the biometric authentication results to the FIDO server 565.

In step S734, the FIDO server 565 performs authentication.

Specifically in the operations in steps S728 through S734, the user 210A is biometrically authenticated on the terminal apparatus 250A. If the user 210A is successfully authenticated, the CTAP communication is performed with the image processing apparatus 300 in BLE GATT. The image processing apparatus 300 performs an authentication request on the FIDO server 565 using UUID of the terminal apparatus 250A and the biometric authentication results. The biometric authentication results are information indicating that the biometric authentication has been successfully performed on the terminal apparatus 250A.

In step S736, the FIDO server 565 acquires the access token issued by the cloud server (contract) 570 and transmits the access token to the image processing apparatus 300.

In step S738, the image processing apparatus 300 receives the access token.

Specifically in the operations in steps S736 and S738, upon having successfully completed the authentication process, the FIDO server 565 acquires the access token issued by the cloud server (contract) 570 that is set beforehand in authentication cooperation with the FIDO server 565 and the FIDO server 565 transmits to the image processing apparatus 300 the access token registered by the user 210A of the terminal apparatus 250A.

In step S740, the image processing apparatus 300 connects to the cloud server (contract) 570 by transmitting a connect request and login information to the cloud server (contract) 570.

In step S742, the cloud server (contract) 570 transmits login results to the image processing apparatus 300.

Specifically in the operations in steps S740 and S742, using the access token acquired from the FIDO server 565, the image processing apparatus 300 connects to the cloud server (contract) 570 provided by the solution service provider 560. The image processing apparatus 300 thus logs in on a cloud service provided by the cloud server (contract) 570.

In step S744, the image processing apparatus 300 performs a scan service and thus transmits scan data to the cloud server (contract) 570.

In step S746, the cloud server (contract) 570 stores the scan data.

In step S748, the image processing apparatus 300 transmits a disconnect request to the cloud server (contract) 570 and then returns to step S702.

In step S750, the cloud server (contract) 570 is disconnected.

Specifically in the operations in steps S744 through S750, after being connected to the cloud server (contract) 570 and successfully logging in on the cloud service provided by the cloud server (contract) 570, the image processing apparatus 300 transmits to the cloud server (contract) 570 data that is read by using the scanner 310 in the image processing apparatus 300. Upon transmitting the scan data, the image processing apparatus 300 logs off from the cloud server (contract) 570 and shifts into a standby state for next use of service.

In the above example, the scan service is utilized. In the case of a print service, step S744 is followed by the following operations described below.

After being connected to the cloud server (contract) 570 and successfully logging in on the cloud service, the image processing apparatus 300 receives print data from the cloud server (contract) 570 and performs a print operation on the printer 305. Upon completing the print operation, the image processing apparatus 300 logs off from the cloud server (contract) 570 and shifts into a standby state for next use of service.

FIGS. 9A and 9B are a flowchart illustrating an example of a process of the exemplary embodiment. In the process, a user (the user 210B) of the cloud server (public) 575 only registers an account of the cloud server (contract) 570 in the solution service provider 560. The process is performed by the terminal apparatus 250B, image processing apparatus 300, FIDO server 565, and cloud server (public) 575.

It is now assumed that the FIDO server 565 and cloud server (public) 575 are configured to perform authentication in cooperation with each other. If the authentication is completed by the FIDO server 565, the cloud server (public) 575 issues the access token.

In step S902, the image processing apparatus 300 generates the code image.

In step S904, the image processing apparatus 300 displays the code image.

In step S906, the terminal apparatus 250B reads the code image.

In step S908, the terminal apparatus 250B retrieves a local name, one-time password, and a list of cloud IDs.

In step S910, the terminal apparatus 250B transmits advertising to the image processing apparatus 300. For example, the advertising includes a local name, usage cloud ID, and UUID of the terminal apparatus 250B. A tenant ticket is not stored and thus not transmitted.

Specifically, the terminal apparatus 250B combines the local name and information on the cloud ID of the usage cloud into a BLE advertising beacon and sends the BLE advertising beacon to the image processing apparatus 300. In this case, the tenant ticket provided by the solution service provider 560 is not stored.

In step S912, the image processing apparatus 300 detects a terminal apparatus 250 via the BLE scan.

In step S914, the image processing apparatus 300 determines whether local names match each other. If the local names match each other, the image processing apparatus 300 proceeds to step S916; otherwise, the image processing apparatus 300 returns to step S902.

In step S916, the image processing apparatus 300 extracts a tenant ticket and decrypts the extracted tenant ticket.

The operations in steps S902 through S916 are identical to the operations in steps S702 through S718 in the flowchart in FIG. 7A. Since the terminal apparatus 250B has no tenant ticket, the terminal apparatus 250B is free from the operation in step S710 in FIG. 7A.

In step S918, the image processing apparatus 300 determines whether there is a tenant ticket. If there is a tenant ticket, the image processing apparatus 300 proceeds to step S722 in the flowchart in FIG. 7B; otherwise, the image processing apparatus 300 proceeds to step S920.

Specifically, since the tenant ticket of the terminal apparatus 250B is not stored, the process shifts into a status of a usage service that is provided under the authority of the user of the cloud server (public) 575. The image processing apparatus 300 shifts to a GAP communication state of the BLE connection.

If a tenant ticket is stored, the image processing apparatus 300 shifts, in accordance with the flowchart (step S722 and subsequent operations) in FIG. 7B, to a status in which a service provided by the solution service provider 560 is usable under the authority available to the terminal apparatus 250A.

In steps S920 and S922, the image processing apparatus 300 and terminal apparatus 250B are connected to each other via BLE connection and exchange BLE packets (GAP).

Specifically, the terminal apparatus 250B performs BLE pairing with the image processing apparatus 300. The terminal apparatus 250B and the image processing apparatus 300, if successfully paired, are connected to each other via the BLE connection.

In step S924, the terminal apparatus 250B performs biometric authentication.

In step S926, the terminal apparatus 250B performs CTAP communication with the image processing apparatus 300, transmitting the BLE packet (GATT) and biometric authentication results.

In step S928, the image processing apparatus 300 transmits authentication information and biometric authentication results to the FIDO server 565.

In step S930, the FIDO server 565 performs authentication.

Specifically in the operations in steps S924 through S930, the user 210B is biometrically authenticated on the terminal apparatus 250B. If the user 210B is successfully authenticated, the CTAP communication is performed with the image processing apparatus 300 in BLE GATT connection. The image processing apparatus 300 performs an authentication request to the FIDO server 565 using UUID of the terminal apparatus 250B and the biometric authentication results.

In step S932, the FIDO server 565, if set beforehand in authentication cooperation with the cloud server (public) 575, acquires the access token issued by the cloud server (public) 575 and transmits the access token to the image processing apparatus 300. The access token may be issued on a per cloud service basis or a common access token may be issued.

In step S934, the image processing apparatus 300 receives the access token.

Specifically in the operations in steps S932 and S934, after having successfully completed the authentication, the FIDO server 565 issues to the image processing apparatus 300 the access token of the cloud server (public) 575 that the user 210B of the terminal apparatus 250B has registered.

In step S936, the image processing apparatus 300 selects a usage cloud and selects a billing method.

In step S938, the image processing apparatus 300 enters a password.

In step S940, the image processing apparatus 300 transmits the access token and connect request to the cloud server (public) 575 to connect to the cloud server (contract) 570.

In step S942, the cloud server (public) 575 transmits login results to the image processing apparatus 300.

Specifically in the operations in steps S936 through S942, the image processing apparatus 300 displays a list of available cloud servers and a list of billing methods on the panel 525 and causes the user 210B to select a cloud server and a billing method. In accordance with the selected information, the image processing apparatus 300 is connected to the cloud server (public) 575 using the access token acquired from the FIDO server 565 and login is performed on the cloud service provided by the cloud server (public) 575 by entering the password.

In step S944, the image processing apparatus 300 performs a scan service to transmit scan data to the cloud server (public) 575.

In step S946, the cloud server (contract) 570 stores the scan data.

The image processing apparatus 300 transmits a disconnect request to the cloud server (contract) 570 in step S948 and then returns to step S902.

In step S950, the cloud server (contract) 570 is disconnected.

Specifically in the operations in steps S944 through S950, if the connection to the cloud server (public) 575 and the login on the cloud service have been successfully completed, data read using the scanner 310 in the image processing apparatus 300 is sent to the cloud server (public) 575. If the scan data has been sent, the image processing apparatus 300 logs off from the cloud server (public) 575 and shifts to a standby state for next use of service.

The process of the scan service has been described. If a print service is performed, the operation in step S944 is followed by operation described below.

After the successful connection to the cloud server (public) 575 and successful login on the cloud service, the image processing apparatus 300 receives document data from the cloud server (public) 575 and print the document data using the printer 305. When the print operation is complete, the image processing apparatus 300 logs off from the cloud server (public) 575 and shifts into a standby state for next use of service.

Processes of the image processing apparatus 300 establishing a connection to the terminal apparatus 250 is described with reference to flowcharts in FIGS. 10 through 15.

Figure 10:
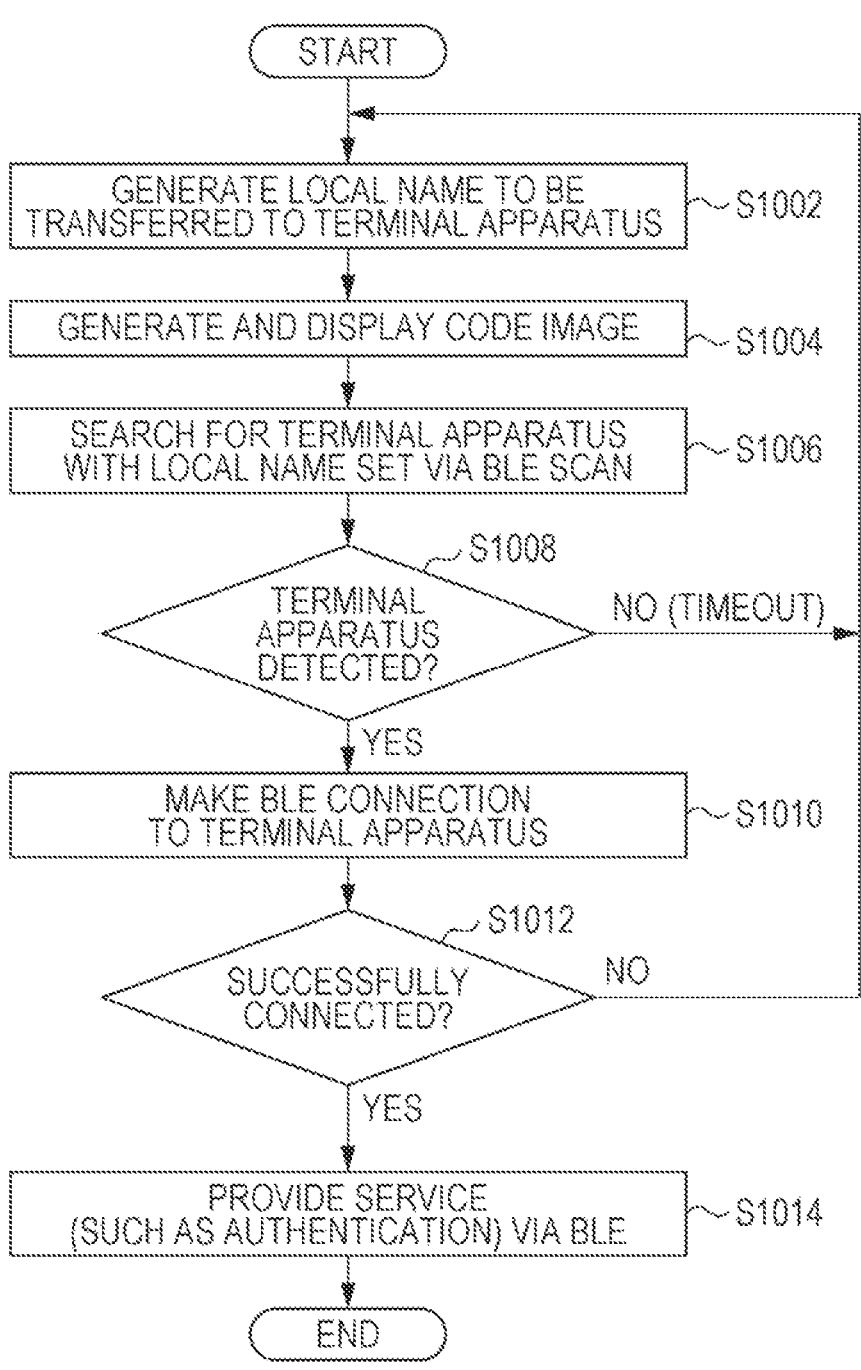
FIG. 10 is a flowchart illustrating an example of a process of the exemplary embodiment.

FIG. 10 is a flowchart illustrating an example of a process (of the image processing apparatus 300) in accordance with the exemplary embodiment.

In step S1002, the image processing apparatus 300 generates a local name to be transferred to the terminal apparatus 250. The local name is an example of the identification information on the image processing apparatus 300.

In step S1004, the image processing apparatus 300 generates the code image 530 having the local name embedded therewithin and displays the code image 530 on the panel 525. This allows the terminal apparatus 250 to read the code image 530.

The local name is updated at a specific timing. For example, the local name may be updated when the terminal apparatus 250 reads the code image 530. In other words, the local name is a one-time value. When the local name is updated, the one-time password may be updated. The one-time password may be updated independently of updating the local name.

The local name may be updated at any of the following timings or at a combination of the following timings.

(1) Timing when the image processing apparatus 300 is started up, (2) Timing when the image processing apparatus 300 shifts into a power-saving mode, (3) Timing when the image processing apparatus 300 is restored from the power-saving mode, (4) Timing at every predetermined period of time, (5) Timing when Bluetooth connection to the terminal apparatus 250 is established, (6) Timing when Bluetooth connection to the terminal apparatus 250 ends, (7) Timing when the user 210 performs an update operation, and (8) Timing when the user 210 performs an operation to display the code image 530.

The local name may be used around with the value thereof unchanged. The time period of "(4) Timing at every predetermined period of time" may be set by the user 210. In other words, the update timing of the local name may be set by the user 210.

In step S1006, the image processing apparatus 300 searches for the terminal apparatus 250 with the local name set via BLE scan. Specifically, the image processing apparatus 300 starts the BLE scan and searches for an advertising packet with the local name generated in step S1002. If the terminal apparatus 250 is not detected within a predetermined period of time, the local name may be updated.

In step S1008, the image processing apparatus 300 determines whether the terminal apparatus 250 has been detected in step S1006. If the terminal apparatus 250 has been detected, the image processing apparatus 300 proceeds to step S1010. If time is out with the terminal apparatus 250 not detected, the image processing apparatus 300 returns to step S1002. Specifically, if an advertising packet broadcast by the terminal apparatus 250 is detected and includes the local name set in step S1002, the image processing apparatus 300 determines that the terminal apparatus 250 having transmitted the advertising packet is a connection partner.

As a connection condition, a distance to the terminal apparatus 250 (strength of a received radiowave) may be accounted for. Specifically, if two or more terminal apparatuses 250 are detected, the image processing apparatus 300 determines that a terminal apparatus 250 providing a stronger received radiowave is the terminal apparatus 250 serving as a BLE connection target.

In step S1010, the BLE connection is made to the terminal apparatus 250. The image processing apparatus 300 requests the terminal apparatus 250 detected (yes path) in step S1008 to perform the BLE connection.

In step S1012, the image processing apparatus 300 determines whether the connection has been successfully made. If the connection has been successfully made, the image processing apparatus 300 proceeds to step S1014; otherwise, the image processing apparatus 300 returns to step S1002.

In step S1014, the image processing apparatus 300 performs service (such as authentication) using BLE. Specifically, if the BLE connection is established between the image processing apparatus 300 and the terminal apparatus 250, the image processing apparatus 300 performs BLE pairing and the service.

Specifically, operations performed herein include (1) BLE paring operation, and (2) authentication using BLE GATT service, namely, an operation of reading account information from the terminal apparatus 250.

If no connection response is obtained from the terminal apparatus 250 for a predetermined period of time, the image processing apparatus 300 quits the connection operation.

If a new terminal apparatus 250 is detected after the connection, switching to the new terminal apparatus 250 or simultaneous connection to the terminal apparatuses 250 may be performed. These operations may be described below.

Figure 11:
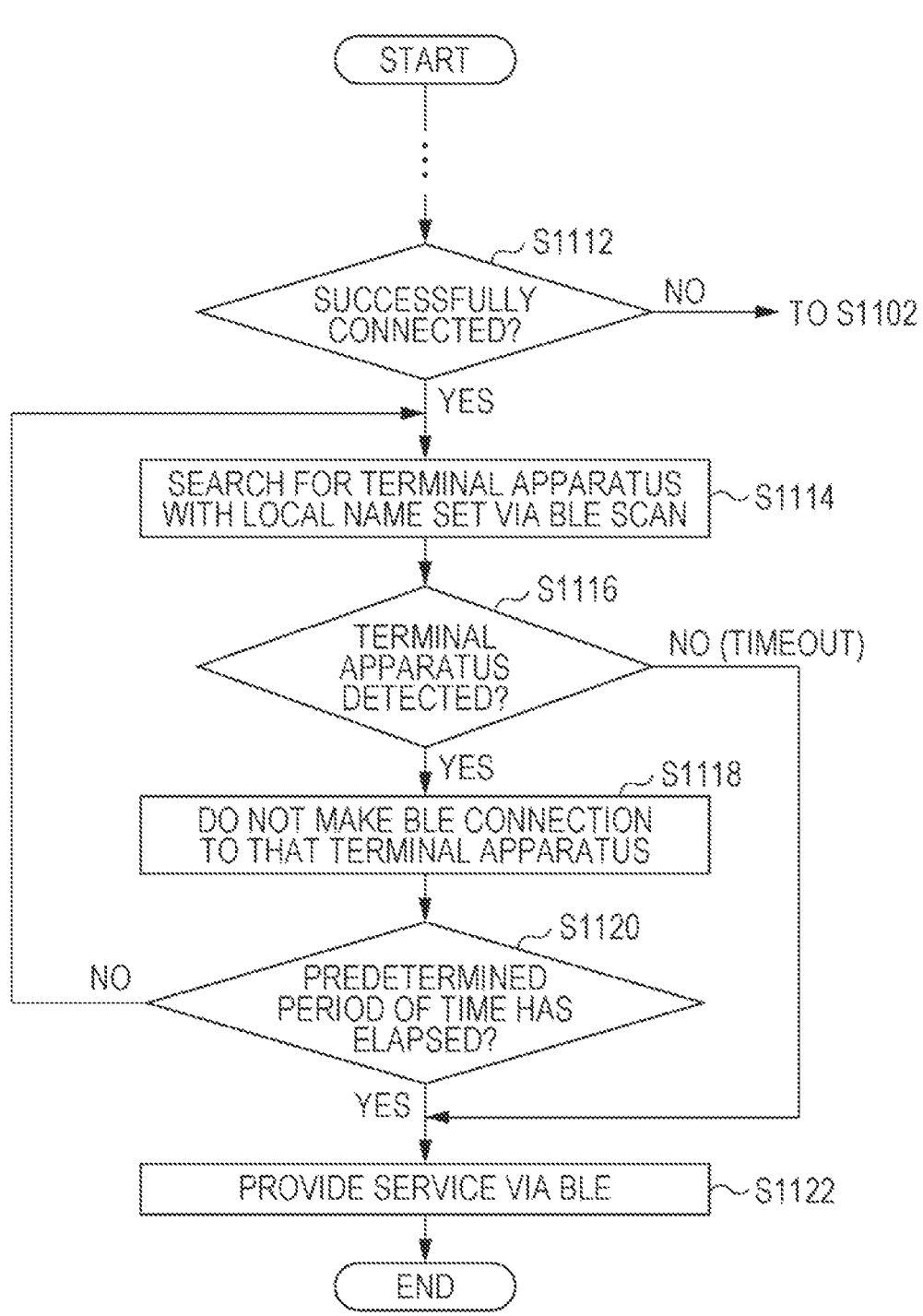
FIG. 11 is a flowchart illustrating an example of a process of the exemplary embodiment.

FIG. 11 is a flowchart illustrating the example of a process of the exemplary embodiment. If a communication from a terminal apparatus 250B is detected within a predetermined period of time from the establishment of the connection to the terminal apparatus 250A, the process performs control such that a connect request to the terminal apparatus 250B is not performed. For example, the event that the communication from the terminal apparatus 250B is detected corresponds to when the communication from the terminal apparatus 250B is detected immediately subsequent to the detection of the communication (e.g., beacon) from the terminal apparatus 250A or when the code images 530 are consecutively read from different terminals.

The operations in steps S1102 through S1112 are respectively identical to the operations in steps S1002 through S1012 in the flowchart in FIG. 10.

In step S1114, the process searches for the terminal apparatus 250 with the local name set via the BLE scan. The operation in step S1114 is identical to the operation in step S1006.

In step S1116, the process determines whether the terminal apparatus 250 has been detected in step S1114. If the terminal apparatus 250 has been detected, the process proceeds to step S1118. If time is out with no terminal apparatus 250 detected, the process proceeds to step S1122. The operation in step S1116 is identical to the operation in step S1008.

In step S1118, the BLE connection is not made to the terminal apparatus 250 detected in step S1116.

In step S1120, the process determines whether a predetermined period of time has elapsed since the successful connection (yes path is followed in step S1112). If the predetermined period of time has elapsed, the process proceeds to step S1122; otherwise, the process returns to step S1114.

In step S1122, the process performs the service (e.g., authentication) using BLE. The operation in step S1122 is identical to the operation in step S1014.

FIG. 12 is a flowchart illustrating the example of a process of the exemplary embodiment. If within a predetermined period of time from the establishment of the connection to the terminal apparatus 250A, the terminal apparatus 250B is caused to read the local name with the code image 530 displayed, the process performs control such that a connect request to connect to the terminal apparatus 250B is not made.

The operations in steps S1202 through S1212 are respectively identical to the operations in steps S1002 through S1012 in the flowchart in FIG. 10.

In step S1214, the process generates the code image 530 with the local name embedded therewithin and displays the code image 530 on the panel 525. The operation in step S1214 is identical to the operation in step S1004.

In step S1216, the process searches for the terminal apparatus 250 with the local name set via the BLE scan. The operation in step S1216 is identical to the operation in step S1006.

In step S1218, the process determines whether the terminal apparatus 250 has been detected in step S1216. If the terminal apparatus 250 has been detected, the process proceeds to step S1220. If time is out with no terminal apparatus 250 detected, the process proceeds to step S1224. The operation in step S1218 is identical to the operation in step S1208.

In step S1220, the process does not perform the BLE connection to the terminal apparatus 250.

In step S1222, the process determines whether a predetermined period of time has elapsed. If the predetermined period of time has elapsed, the process proceeds to step S1224; otherwise, the process returns to step S1214.

In step S1224, the process performs the service (e.g., authentication) using BLE. The operation in step S1224 is identical to the operation in step S1014.

Figure 13:
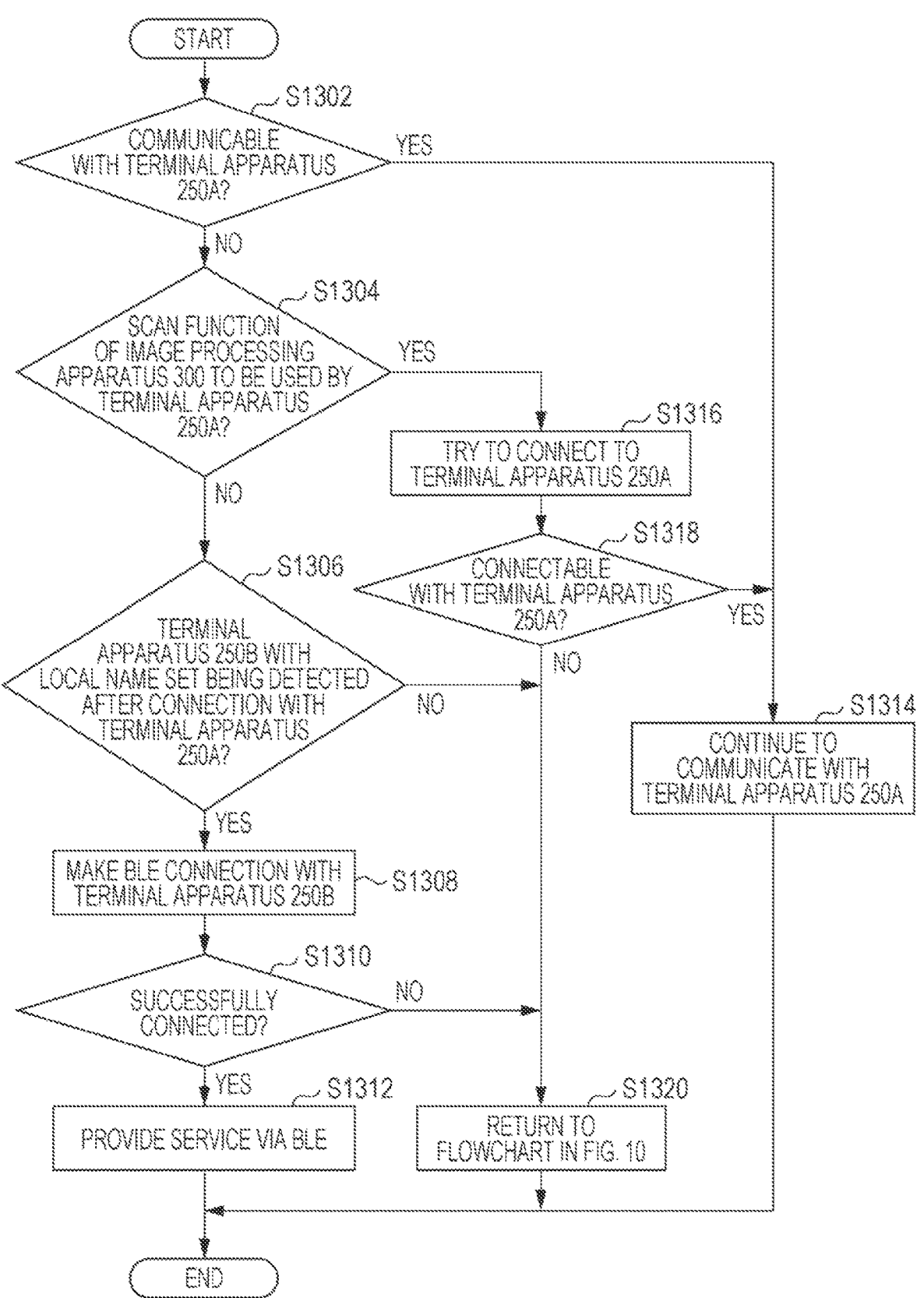
FIG. 13 is a flowchart illustrating an example of a process of the exemplary embodiment.

FIG. 13 is a flowchart illustrating the example of a process of the exemplary embodiment. The process performs when communication with the terminal apparatus 250A having established communication in the flowchart in FIG. 11 or FIG. 12 becomes difficult. The process performs control such that a request for the BLE connection is made on the terminal apparatus 250B having requested a connection. The terminal apparatus 250B having requested the connection is the terminal apparatus 250 to which the BLE connection has not been made in the flowchart in FIG. 11 or 12 (step S1118 or S1220).

The flowchart in FIG. 13 illustrates the process performed after the BLE connection is established with the terminal apparatus 250A.

In step S1302, the process determines whether the communication with the terminal apparatus 250A is possible. If the communication with the terminal apparatus 250A is possible, the process proceeds to step S1314; otherwise, the process proceeds to step S1304.

In step S1304, the process determines whether the terminal apparatus 250A utilizes a scan function of the image processing apparatus 300. If the terminal apparatus 250A utilizes the scan function, the process proceeds to step S1316; otherwise (e.g., the print function of the image processing apparatus 300 is used), the process proceeds to step S1306.

In step S1306, the process determines whether the terminal apparatus 250B with the local name set thereon has been detected since the connection to the terminal apparatus 250A. If the terminal apparatus 250B has been detected, the process proceeds to step S1308; otherwise, the process proceeds to step S1320.

In step S1308, the process performs the BLE connection to the terminal apparatus 250B. The operation in step S1308 is identical to the operation in step S1010.

In step S1310, the process determines whether the connection has been successful. If the connection has been successful, the process proceeds to step S1312; otherwise, the process proceeds to step S1320. The operation in step S1310 is identical to the operation in step S1012.

In step S1312, the process performs the service (e.g., authentication) using BLE. The operation in step S1312 is identical to the operation in step S1014.

In step S1314, the process continues to communicate with the terminal apparatus 250A.

In step S1316, the process tries to connect to the terminal apparatus 250A.

In step S1318, the process determines according to results of the operation in step S1316 whether the terminal apparatus 250A is connectable. If the terminal apparatus 250A is connectable, the process proceeds to step S1314; otherwise, the process proceeds to step S1320.

In step S1320, the process returns to the flowchart (step S1002) in FIG. 10.

Figure 14:
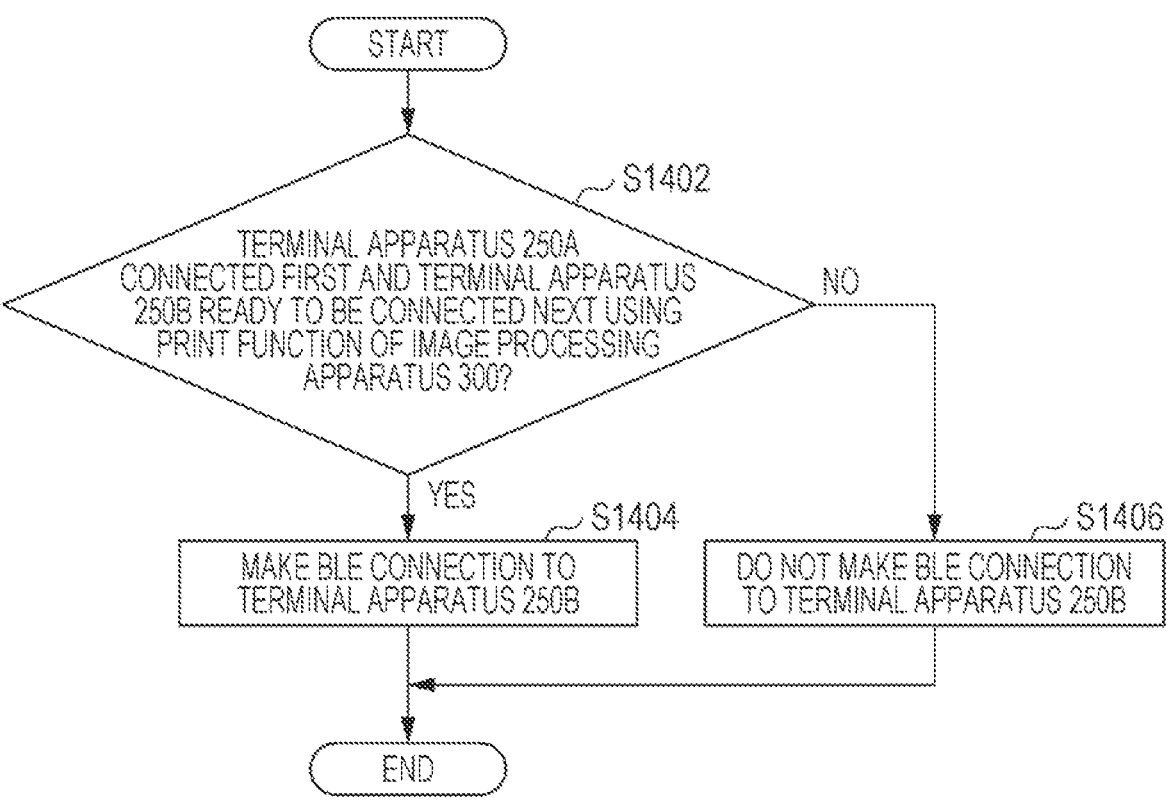
FIG. 14 is a flowchart illustrating an example of a process of the exemplary embodiment.

The operation in step S1118 in the flowchart in FIG. 11 or the operation in step S1220 in the flowchart in FIG. 12 may be replaced with a process in a flowchart in FIG. 14.

FIG. 14 is a flowchart illustrating the example of the process of the exemplary embodiment. If a communication from the terminal apparatus 250B is detected within a predetermined period of time after the establishment of the connection, the process place a request for the BLE connection to the terminal apparatus 250B. Specifically, if the terminal apparatuses 250A and 250B utilize the print function of the image processing apparatus 300, the process also places a request for the BLE connection to the terminal apparatus 250B.

In step S1402, the process determines whether the terminal apparatus 250A connected first and the terminal apparatus 250B ready to be connected next are to utilize the print function of the image processing apparatus 300. If the print function of the image processing apparatus 300 is to be utilized, the process proceeds to step S1404; otherwise, the process proceeds to step S1406.

In step S1404, the process performs the BLE connection to the terminal apparatus 250B.

In step S1406, the process does not perform the BLE connection to the terminal apparatus 250B.

The operation in step S1122 in the flowchart in FIG. 11 or the operation in step S1224 in the flowchart in FIG. 12 may be replaced with an operation to "perform the print operation of the terminal apparatuses 250A and 250B using BLE."

Figure 15:
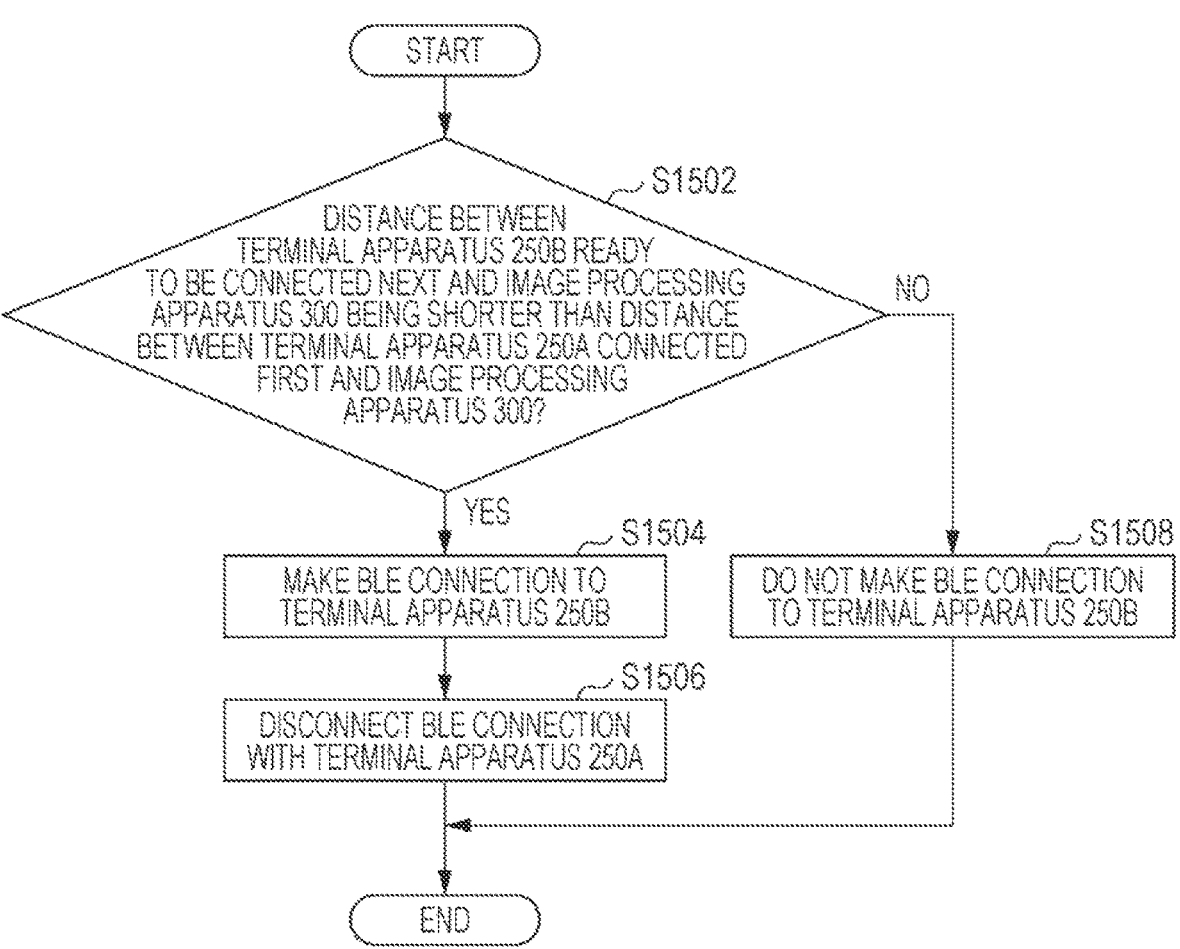
FIG. 15 is a flowchart illustrating an example of a process of the exemplary embodiment.

The operation in step S1118 in the flowchart in FIG. 11 or the operation in step S1220 in the flowchart in FIG. 12 may be replaced with a process in a flowchart in FIG. 15.

FIG. 15 is a flowchart illustrating the example of the process of the exemplary embodiment. A communication from the terminal apparatus 250B may be detected within a predetermined period of time from the establishment of the connection to the terminal apparatus 250A. In such a case, if the terminal apparatus 250B is closer to the image processing apparatus 300 than the terminal apparatus 250A, the process performs control such that a request for the BLE connection is made on the terminal apparatus 250B.

In step S1502, the process determines whether the terminal apparatus 250B ready to be connected next is closer in distance to the image processing apparatus 300 than the terminal apparatus 250A connected first. If the terminal apparatus 250B is closer to the image processing apparatus 300, the process proceeds to step S1504; otherwise, the process proceeds to step S1508. A determination as to whether the terminal apparatus 250B is closer may be performed by using the strength of a radiowave received from the terminal apparatus 250 as previously described. If the radiowave from the terminal apparatus 250B is stronger than the radiowave from the terminal apparatus 250A, the process proceeds to step S1504. If the radiowave from the terminal apparatus 250A is stronger than the radiowave from the terminal apparatus 250B, the process proceeds to step S1508.

In step S1504, the process performs the BLE connection to the terminal apparatus 250B.

In step S1506, the process disconnect the BLE connection from the terminal apparatus 250A.

In step S1508, the process does not perform the BLE connection to the terminal apparatus 250B.

If three or more terminal apparatuses 250 are connected or connectable, the operation in step S1502 may be replaced with an operation to "determine whether a terminal apparatus 250 closest in distance to the image processing apparatus 300 is other than the terminal apparatus 250A already connected." The operation in step S1504 may be replaced with an operation to "make the BLE connection to the closest terminal apparatus 250."

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The program described above may be supplied in the recorded form on a recording medium or via a communication medium. In such a case, the program may be construed as a non-transitory computer readable recording medium having stored the program.

The non-transitory computer readable recording medium refers to a computer readable recording medium having recorded the program that may be utilized to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part or whole of another program, or may be stored on the recording medium together with another program. The program may be split and the split programs may then be separately stored on the recording media. The program may be processed in any fashion before being stored as long as the program remains restorable. For example, the program may be compressed or encrypted before storage.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory storing identification information on the information processing apparatus; and
a processor configured to:
generate a code image including the identification information and cause a display to display the code image;
search a packet from a first terminal apparatus and, if the packet includes the identification information on the information processing apparatus and the processor detects the first terminal apparatus as a transmission source, make a connect request to the first terminal apparatus via a communication unit that performs wireless communication;
perform control to establish a connection to the first terminal apparatus; and acquire authentication information included in the packet after establishment of the connection to the first terminal apparatus and after a right of usage of au ser of the first terminal apparatus is determined, and permit a user of the first terminal apparatus to utilize a service in accordance with the acquired authentication information, and, in order to permit the user to use the service, request a FIDO server to authenticate the authentication information and acquire authentication results from the FIDO server, wherein, for the authenticating of the authentication information, the FIDO server receives biometric authentication information without GATT protocol information.

2. The information processing apparatus according to claim 1, wherein the processor is configured to detect the packet from the first terminal apparatus and, if the packet does not include the identification information, perform control not to make a connect request to connect to the first terminal apparatus.

3. The information processing apparatus according to claim 1, wherein the processor is configured to, if a packet from a second terminal apparatus is detected within a predetermined period of time from establishment of the connection to the first terminal apparatus, perform control not to make a connection to the second terminal apparatus.

4. The information processing apparatus according to claim 3, wherein the processor is configured to, if communication with the first terminal apparatus fails after the establishment of the connection to the first terminal apparatus, perform control to permit a connection to be performed to the second terminal apparatus via the communication unit.

5. The information processing apparatus according to claim 3, wherein the information processing apparatus is an image processing unit, and
wherein the processor is configured to, if the first terminal apparatus utilizes a read function of the information processing apparatus, perform control not make the connection to the second terminal apparatus.

6. The information processing apparatus according to claim 1, wherein the processor is configured to, if a packet from a second terminal apparatus is detected within a predetermined period of time from establishment of the connection to the first terminal apparatus, make a connection to the second terminal apparatus via the communication unit.

7. The information processing apparatus according to claim 6, wherein the information processing apparatus is an image processing unit, and
wherein the processor is configured to, if the first terminal apparatus and the second terminal apparatus utilize a read function of the information processing apparatus, enable the connection to the second terminal apparatus via the communication unit.

8. The information processing apparatus according to claim 1, wherein the processor is configured to perform control to enable a connection to a second terminal apparatus via the communication unit when a packet from the second terminal apparatus is detected within a predetermined period of time from establishment of the connection to the first terminal apparatus and if the second terminal apparatus is closer in distance to the information processing apparatus than the first terminal apparatus.

9. The information processing apparatus according to claim 1, wherein the processor is configured to, after the display displays the identification information on the information processing apparatus, modify the identification information.

10. The information processing apparatus according to claim 9, wherein a timing of modifying the identification information on the information processing apparatus is a timing when the information processing apparatus is started up, a timing when the information processing apparatus shifts into a power-saving mode, a timing when the information processing apparatus is restored from the power-saving mode, a timing at every predetermined period of time, a timing when the connection is established with the first terminal apparatus, a timing when the connection to the first terminal apparatus is disconnected, a timing when an update operation is performed by an operator, a timing when an operation to display the code image is performed by an operator, or a combination of two or more of the timings.

11. The information processing apparatus according to claim 1, wherein the processor is configured to generate not only the identification information but also a code image including a password.

12. The information processing apparatus according to claim 11, wherein the processor is configured to, using the password, decrypt the identification information included in the packet from the first terminal apparatus.

13. The information processing apparatus according to claim 1, wherein the processor is configured to generate not only the identification information but also a code image including information indicating a service provided via the information processing apparatus.

14. The information processing apparatus according to claim 13, wherein the processor is configured to connect to an outside service using information indicating a service included in the packet from the first terminal apparatus.

15. An information processing system comprising an information processing apparatus and a terminal apparatus, wherein the information processing apparatus includes:
a memory storing identification information on the information processing apparatus; and
a first processor configured to:
generate a code image including the identification information and cause a display to display the code image;
search a packet from the terminal apparatus and, if the packet includes the identification information on the information processing apparatus and the processor detects the first terminal apparatus as a transmission source, make a connect request to the terminal apparatus via a first communication unit that performs wireless communication;
perform control to establish a connection to the terminal apparatus;
acquire authentication information included in the packet after establishment of the connection to the terminal apparatus and after a right of usage of a user of the first terminal apparatus is determined, and permit a user of the terminal apparatus to utilize a service in accordance with the acquired authentication information, and, in order to permit the user to use the service, request a FIDO server to authenticate the authentication information and acquire authentication results from the FIDO server, wherein, for the authenticating of the authentication information, the FIDO server receives biometric authentication information without GATT protocol information and
wherein the terminal apparatus includes a second processor configured to:
extract the identification information from the code image by reading the code image using a reading unit;
by communicating the identification information, receive a connect request from the information processing apparatus via a second communication unit that performs wireless communication; and
perform control to establish a connection to the information processing apparatus.

16. A non-transitory computer readable medium storing a program causing a computer to execute a process, the process comprising:
storing identification information on an information processing apparatus;
generating a code image including the identification information and cause a display to display the code image;
searching a packet from a terminal apparatus,
if the packet includes the identification information on the information processing apparatus and the first terminal apparatus is detected as a transmission source, making a connect request to the terminal apparatus via a communication unit that performs wireless communication;
performing control to establish a connection to the terminal apparatus; and
acquiring authentication information included in the packet after establishment of the connection to the terminal apparatus and after a right of usage of a user of the first terminal apparatus is determined, and permitting a user of the terminal apparatus to utilize a service in accordance with the acquired authentication information, and, in order to permit the user to use the service, requesting a FIDO server to authenticate the authentication information and acquiring authentication results from the FIDO server, wherein, for the authenticating of the authentication information, the FIDO server receives biometric authentication information without GATT protocol information.

* * * * *